United States Patent
Wolff et al.

(10) Patent No.: US 7,849,053 B2
(45) Date of Patent: Dec. 7, 2010

(54) COORDINATION AND TRACKING OF WORKFLOWS

(75) Inventors: Gregory J. Wolff, Palo Alto, CA (US); Kurt W. Piersol, Campbell, CA (US)

(73) Assignee: Ricoh Co. Ltd., Tokyo (JP)

( * ) Notice: Subject to any disclaimer, the term of this patent is extended or adjusted under 35 U.S.C. 154(b) by 321 days.

(21) Appl. No.: 11/322,435

(22) Filed: Dec. 29, 2005

(65) Prior Publication Data

US 2007/0156632 A1    Jul. 5, 2007

(51) Int. Cl.
- G06F 7/00 (2006.01)
- G06F 17/30 (2006.01)
- G06F 9/44 (2006.01)
- G06F 17/50 (2006.01)
- G06F 9/46 (2006.01)
- G05B 19/418 (2006.01)

(52) U.S. Cl. .................. 707/608; 705/7; 705/8
(58) Field of Classification Search .......... 707/608, 707/999.006; 705/7, 8
See application file for complete search history.

(56) References Cited

U.S. PATENT DOCUMENTS

| | | | |
|---|---|---|---|
| 5,949,876 A * | 9/1999 | Ginter et al. | 705/80 |
| 6,308,175 B1 | 10/2001 | Lang et al. | |
| 6,341,316 B1 | 1/2002 | Kloba et al. | |
| 6,345,288 B1 | 2/2002 | Reed et al. | |
| 6,360,215 B1 | 3/2002 | Judd et al. | |
| 6,546,385 B1 | 4/2003 | Mao et al. | |
| 6,615,208 B1 | 9/2003 | Behrens et al. | |
| 6,687,696 B2 | 2/2004 | Hofmann et al. | |
| 6,754,773 B2 * | 6/2004 | Ulrich et al. | 711/118 |
| 7,203,796 B1 | 4/2007 | Muppalaneni et al. | |
| 7,278,115 B1 * | 10/2007 | Conway et al. | 715/838 |
| 7,406,487 B1 * | 7/2008 | Gupta et al. | 1/1 |
| 2002/0023221 A1 | 2/2002 | Miyazaki et al. | |
| 2002/0046072 A1 * | 4/2002 | Arai et al. | 705/8 |
| 2002/0055942 A1 * | 5/2002 | Reynolds | 707/200 |
| 2002/0095454 A1 | 7/2002 | Reed et al. | |
| 2002/0120484 A1 * | 8/2002 | Bantz et al. | 705/8 |

(Continued)

FOREIGN PATENT DOCUMENTS

EP    1622074    2/2006

(Continued)

OTHER PUBLICATIONS

"ATTRIB", *PC Computer Notes & Online Tutorials*, http://web.archive.org/web/20021204074423/http://www.pccomputernotes.com/operating_systems/dos04.htm, (Dec. 4, 2002), 5 pages.

(Continued)

*Primary Examiner*—Hosain T Alam
*Assistant Examiner*—Van H Oberly
(74) *Attorney, Agent, or Firm*—Blakely, Sokoloff, Taylor & Zafman LLP

(57) ABSTRACT

A method and an apparatus for coordinating and/or tracking workflows are disclosed. In one embodiment, the method comprises performing a workflow having a series of two or more processing operations and, for each of the two or more processing operations, calculating an identifier and adding at least one metadata entry corresponding to said each of the two or more processing operations to a set of metadata entries corresponding to a digital object.

25 Claims, 18 Drawing Sheets

U.S. PATENT DOCUMENTS

| | | | |
|---|---|---|---|
| 2003/0046586 A1 | 3/2003 | Bheemarasetti et al. | |
| 2003/0050863 A1 | 3/2003 | Radwin | |
| 2003/0053655 A1 | 3/2003 | Barone et al. | |
| 2003/0088593 A1* | 5/2003 | Stickler | 707/205 |
| 2003/0126148 A1* | 7/2003 | Gropper et al. | 707/100 |
| 2003/0158944 A1 | 8/2003 | Branson et al. | |
| 2004/0030681 A1* | 2/2004 | Shannon et al. | 707/3 |
| 2004/0064833 A1 | 4/2004 | Lee et al. | |
| 2004/0260593 A1* | 12/2004 | Abraham-Fuchs et al. | 705/8 |
| 2005/0038809 A1* | 2/2005 | Abajian et al. | 707/102 |
| 2005/0055343 A1 | 3/2005 | Krishnamurthy | |
| 2005/0071209 A1* | 3/2005 | Tatavu et al. | 705/7 |
| 2005/0091229 A1 | 4/2005 | Bali et al. | |
| 2005/0262243 A1* | 11/2005 | Ternasky et al. | 709/225 |
| 2005/0289187 A1* | 12/2005 | Wong et al. | 707/200 |
| 2006/0149558 A1* | 7/2006 | Kahn et al. | 704/278 |
| 2006/0150079 A1* | 7/2006 | Albornoz et al. | 715/512 |
| 2007/0094467 A1 | 4/2007 | Yamasaki | |
| 2007/0143356 A1* | 6/2007 | Kleinsmith et al. | 707/201 |
| 2008/0071646 A1 | 3/2008 | Hodson et al. | |

FOREIGN PATENT DOCUMENTS

| | | |
|---|---|---|
| WO | WO-03071392 | 8/2003 |

OTHER PUBLICATIONS

"EP1804180 International Search Report", (Apr. 18, 2007), 6 pages.

Blanton, "Microsoft Computer Dictionary", *Microsoft Press, Fifth Edition*, (Jan. 22, 2002), p. 578.

FLICKR, "Photo tags", http://web.archive.org/web/20040607054247/http://www.flickr.com/photos/tags/, (Jun. 7, 2004), 1.

Hisashi, Toyoshima, et al., "Hysteresis Signature and its Related Technologies to Maintain the Digital Evidence for Network Activities in Future Soceity," Journal of the National Institute of Information and Communications Technology vol. 52 Nos. 1/2 2005 pp. 191-201.

Phan, Thomas, et al., "Challenge: Integrating Mobile Wireless Devices Into the Computational Grid", *MOBICOM'02*, (Sep. 23-28, 2002), 271-278.

Tkachenko, Oleg, "Log file in XML format?", http://www.tkachenko.com/blog/archives/000053.html, (Jul. 22, 2003), pp. 1-4.

\* cited by examiner

```
<doc SHA1 = A ... >
    <entry SEQ = 1
           SHA1 = C>
    First comment on doc A
    </entry>
    <entry SEQ = 2
           SHA1 = D
           HREF = URL
           SRC = URL>
    Another comment
    </entry
    ...
</doc>
``` http://RP.net/A/
XML listing of comments on document "a"

FIG. 3

COORDINATION AND TRACKING OF WORKFLOWS

FIELD OF THE INVENTION

The present invention relates to the field of digital object distribution; more particularly, the present invention relates to synchronizing information corresponding to a digital object.

BACKGROUND OF THE INVENTION

Millions of documents are sent back and forth every day. Substantial effort and time is spent in the overhead of addressing these documents. In the workplace, this substantial time and effort results in increased cost and expense.

One typical problem with documents involves the synchronization of distributed work. Synchronization of distributed work involves the arrangement of work. When the work involves a document, such synchronization may involve coordinating the information corresponding to the document. For example, when a number of parties are making comments about a document, the comments may be arranged and/or ordered to provide a better understanding or a more complete state of the document's review.

Many document management systems have been proposed and implemented in the past. These document management systems include systems that store documents and handle the coordination of requests with responses. However, these systems do not cut across organizational boundaries and do not perform the synchronization that is necessary.

A Web log is an online document management tool used to record information. Web logs use a client-server framework to permit the addition or subtraction of content from one or more client locations to a server that hosts the web log. Because one server hosts each web log, web logs are typically anchored to a particular HTTP location.

SUMMARY OF THE INVENTION

A method and an apparatus for coordinating and/or tracking workflows are disclosed. In one embodiment, the method comprises performing a workflow having a series of two or more processing operations and, for each of the two or more processing operations, calculating an identifier and adding at least one metadata entry corresponding to said each of the two or more processing operations to a set of metadata entries corresponding to a digital object.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 3 illustrates an exemplary sketch of a XML file that represents the log associated with a document;

DETAILED DESCRIPTION OF THE PRESENT INVENTION

Figure 1:
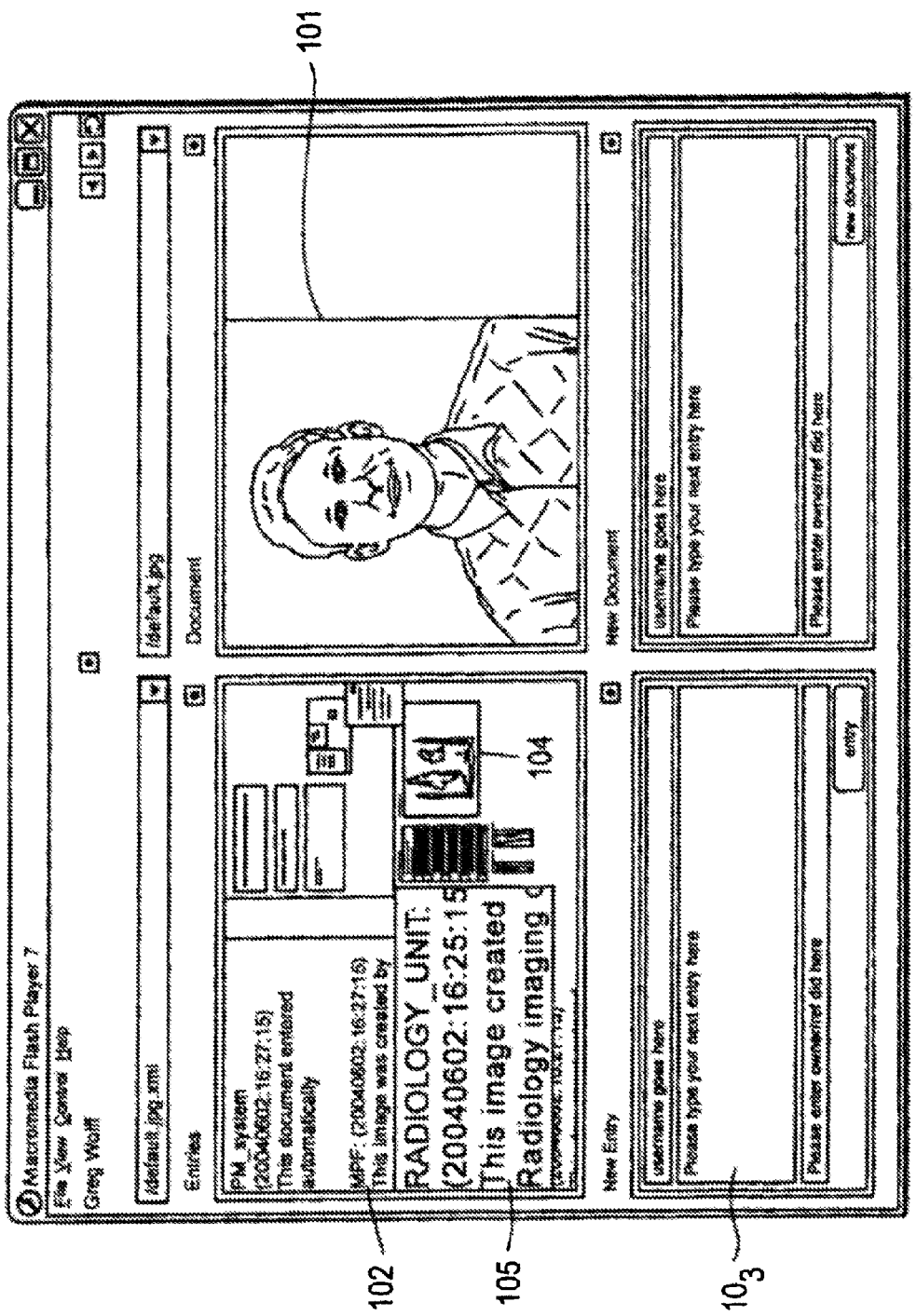
FIG. 1 illustrates an exemplary user interface.

A method and apparatus for using information in a set of metadata entries that corresponds to a digital object (e.g., a document are disclosed). This set is referred to herein as a document log. A document log has log entries of metadata. The metadata may comprise short text messages, data in binary format, and/or optional links entered by one or more people or automated systems. The document log may be distributed. In one embodiment, the document log is distributed as XML.

There are a number of applications that use document logs and the information contained therein. These include, but are not limited to, detecting a workflow, coordinating and tracking a workflow, refining knowledge of a digital object (e.g., a document) using log content, mobile device communications, etc.

Unlike the client/server framework of weblogs, document log distribution and processing is a process distributed among nodes (e.g., units, devices, etc.) connected in a network. The process can be arbitrarily scaled. In one networked environment, each node minimally provides caching and synchronization for log entries, and the ability to exchange entries with other nodes. Additionally, user interface nodes (e.g., clients) provide views of entries and the anchoring document along with a mechanism for adding new entries and/or following links.

In one embodiment, for any given document log or set of logs, a single node is designated as responsible for synchronizing log entries. The role of this "synchronizing" node is to synchronize distributed work so that nodes can agree on the order in which log entries were made. The synchronizing node may be a server. In particular, the synchronizing node provides a canonical ordering of entries for each document log. In other embodiments, such synchronization may be performed locally by serving a single workgroup or globally via a Web service. Two nodes that agree to use the same synchronizing node can then rely on having the same ordering for the entries.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Document Logs in General

A log (e.g., document log) consists of a digital object along with one or more sets of metadata. The digital objects can be represented as a sequence of bytes. The digital object may be a document and the metadata may correspond to a set of comments associated with the document. Thus, for each document, there exists a set of comments associated with that document. Comments, which generally consist of text strings, may be documents themselves and could consist of arbitrary byte strings. Comments may be simple text entries that might refer to other documents and can be created by anyone or anything. In the context of a draft technical paper, a set of comments might represent feedback from different reviewers. In the context of a photograph (e.g., jpeg file), the set of comments might include stories about the event depicted in the photograph such as a birthday party. In the context of a patient chart, the set of comments might include references to individual appointments or visits for the patient.

Techniques are described herein for exchanging and merging the lists of comments associated with a document together (without conflicts).

In one embodiment, document logs are represented using a simple XML format that specifies the "anchoring" document and list of entries. For example, a format such as the simple syndication (RSS) format could easily be adapted to serve the same purpose.

In one embodiment, an exchange mechanism is used to enable two nodes to exchange a list of entries. In one embodiment, the nodes use the HTTP GET methods to retrieve the XML file corresponding to a document log and the HTTP POST method to send an XML file or string with entries to a node. For purpose herein, GET will refer to the action of retrieving content associated with a locator, whether used as part of HTTP or not. Alternatively, other exchange mechanisms, including simple file copy operations or even shared file systems may be used.

A node may include a user interface to enable an individual to view and add to the document log entries. Many user interfaces are possible for viewing and adding to document logs. An exemplary user interface is shown in FIG. 1. Referring to FIG. 1, a representation of the anchoring document 101 on the right hand side and document log entries 102 on the left-hand side. On the bottom of the left-hand side is a text box 103 that allows the user to type in a new entry.

FIG. 1 shows a prototype user interface for viewing of a document log. In this example, the document is an image (e.g., corresponding to a patient) and the entries correspond to information about that patient. These entries include links to other documents, such as appointments or procedure results, and their associated logs. Thus, the user interface of FIG. 1 facilitates a hypothetical use for tracking patient information. On the right side of FIG. 1 is a document, in this case a picture of the patient. Log entries 102 are entries associated with the patient. Some of these entries are manually typed in by office staff, physicians, or the patient themselves, and other entries are created automatically by related systems, such as a scheduling system or radiologic imaging machines. For each entry in such a document log, a link to another document may be included in the entry. A small thumbnail 104 of the related document is shown to the right of that entry.

Figure 2:
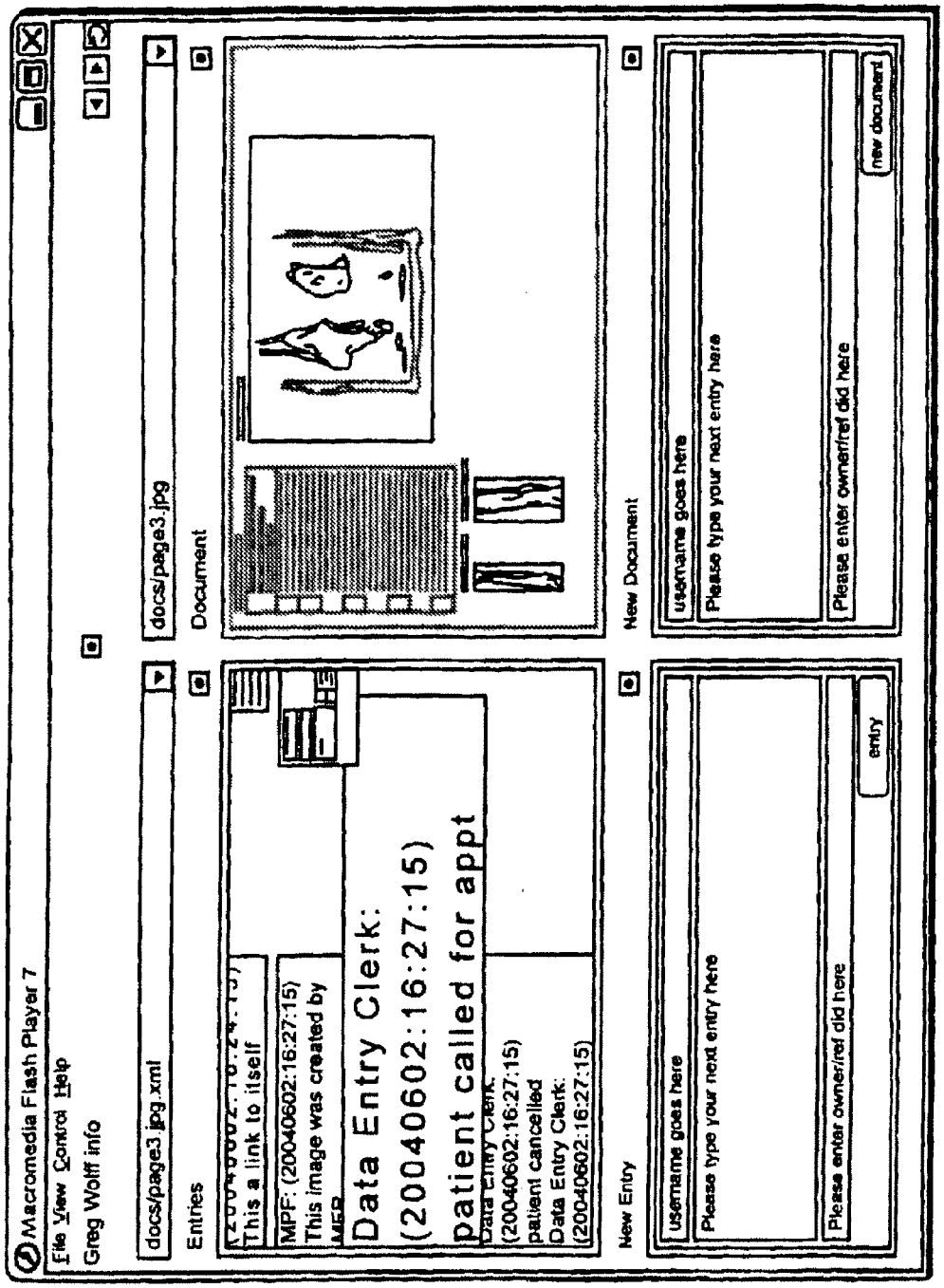
FIG. 2 illustrates the view of a log associated with the radiology image that was referenced by the highlighted comment in FIG. 1.

In one embodiment, the "active" comment underneath the cursor is enlarged with a fisheye effect to enable rapid browsing of many comments within a single list. In one exemplary user interface, entry 105 underneath the mouse cursor is enlarged so as to be easily visible. In the example shown here, the highlighted entry may have been created automatically by a machine in a manner well known in the art. The identifier for the document log shown might have been entered into the machine by use of a bar code or other mechanism on a printed version of this document log. An item that was automatically entered into the original document log includes a link to the document log containing the imaging results created automatically by the imaging machine. Clicking on any of entries 102 takes the user to the document log associated with that entry. Clicking on a comment that has been associated with a link that points to a related document takes the user to the view of the document and log associated with the referenced document. FIG. 2 shows the view of a log associated with the radiology image that was referenced by the highlighted comment in FIG. 1. Referring to FIG. 2, a document that was produced automatically by an x-ray machine and the comments that have been associated with that document are shown.

In some cases, the log associated with the referenced document will have an entry pointing back to the original log containing the link, but in many cases it will not. Navigation tools at the top of this prototype viewer provide forward and backward functions similar to a standard web browser.

In addition to images, document types may include word processing files, flash paper, Excel files, text documents, or any other type of data. In the current system, any single file (or individually addressable unit) can be used as a "document."

Documents as Locations

Conceptually, a document log may represent a virtual space or (file) hierarchy. The origin of the space—a "root" node—is defined by the document itself. Directory names could be used specify locations of the virtual space. However, in one embodiment, instead of using directory names to specify location, the hash values of the documents themselves are used to specify location of documents and comments on the virtual space or file hierarchy. For example, /A/C represents a comment (c with C=SHA1(c)) on a document (a with A=SHA1(A)), where SHA1 is a hash function that maps an arbitrary sequence of bytes into a fixed size sequence. That is, the letter A is used to indicate the hash of object a, A=SHA1 (a) where A represents any sequence of bytes. For example the string "This is a character string." maps into '97d981dad06b03622cbf8e1a5642724cbcae64f8' (using hexadecimal notation).

The storage associated with this representation could be a standard directory structure, for example, A as the name of a directory and C as the name of a file containing the comment on a. Other storage mechanisms, such as a database using the hash values as primary keys, would work equally well and any node may use one or more such storage mechanisms. A confusing case in which the value of a is itself a string which can be interpreted as a path or a uniform resource locator (URL). If a='http://foo.com/path/to/file.ext' then it may be ambiguous whether c is a comment about the location, is a comment about a web page whose contents might change, or a comment about the contents of that web page at some particular point in time. In the latter case, it is safer to use the hash of the contents (if available) as the anchoring document rather than the hash of the reference string as the anchor.

Note that if a is a string and a valid URL, then individual nodes may choose to combine comments on the string as well as comments on the "known" contents that have been obtained from that URL. Also note that by convention, the document log of a might include an entry for each of the contents that has been available from a along with the pointers to the document log associated with this particular contents.

For purposes of the description herein, in one embodiment, a document is an immutable object identical to a particular sequence of bytes, and the hash value of a document is used as a reference to that document. Since different versions of a document have different hash values, the different versions are considered to be different documents. (By convention if D2 is a new version of document D1, the log of document D1 will have an entry pointing to D2 and the log of D2 will have an entry pointing back to D1.)

More specifically with respect to the use of hash functions and directory structures, for example, a JPEG file, a Word document, a postscript document, a text string, etc. $a_u$ indicates a location (e.g., a URL) of object a, such as http://www.server.com/path/a.jpg or file:///path/to/a.jpg $$a = GET(a_u)$$

(a is the result of retrieving $a_u$)

Let $A_u$ denote the set of locations $a_u$ for which SHA1(GET$(a_u)$)==A

Each element of $A_u$ corresponds to a location which returns the digital object, that is a string representation of a.

A new "virtual" SHA1 protocol may be defined as follows: SHA1://host.name/A/B/C that represents a relationship between A, B, C and their corresponding values, a, b, and c. The value b is a comment (or document log entry) on a, while c is a comment on b.

As with any URL, if GET(SHA1://host.name/A/B/C) succeeds, it returns some content as a string of bytes. Unlike other protocols, this content is c and therefore is not just identical for any host, but is also be immutable. In other words, it is an error if SHA1(GET(SHA1:// . . . /C)) does not equal c. Thus, if a node has a copy of c, then it does not need to perform any communications to return GET(SHA1:// . . . /C) (assume that clients compute SHA1(c) and store the results and any lookup table using C as the key).

Note that just as the same image file may be located in several places, the same comments may be related to several documents. If c is a comment on b, then both SHA1:///A/B/C and SHA1:///B/C are valid URLs. The comment c might also be a comment on document X, in which case SHA1:///X/C would also be valid. Valid in this sense means that someone or some process actually added c as a comment on documents x and b Document Log Listings By convention a trailing slash is used to indicate a listing of comments associated with a document. In one embodiment, GET(SHA1://host.com/A/) returns from host.com a listing of comments on document a (a standard XML format). Likewise, SHA1://foo.com/A/ refers to a listing from host foo.com./A/ is a reference to the locally known comments on a. SHA1://host.com/A/C/ refers to a listing of comments on comment a from host.com, etc.

An exemplary algorithm for performing lookup of H/A/C is as follows:

a) check local storage for C (storage can be hash table, database, file directory, etc.)

b) if available, then get and return associated value (e.g., content) (Note if instead the set, C/, is being looked up, then add the associated set to results and (optionally) continue check local storage for A, if found, then get associated set of comments)

c) compute hashes of comments d) if any comment has hash C, return that comment e) look up domain name H (which may also be a hash of the string corresponding to a URL, which is handled below)

f) send GET request to H with A/C g) return results (and optionally check for valid hash)

h) send the request to one or more preconfigured servers (note that the servers may have been previous locations for getting A or a)

i) if H is a hash of a URL, h, then use that URL in a normal GET request that should return a The h/ or h.xml or similar standard variations on h can be used by the client as a request to the server for list of comments (e.g., XML file), which can be used to compute C (e.g., if c is one of the entries in that file).

Clients may also maintain a list mapping A to u1 and u2, where u1 is a set of locations from which the client has obtained a (or information based on a) and u2 are locations containing comments on a (e.g., XML files). In an alternative embodiment, the client may simply look up u2, retrieve the associated set(s) of comments, and attempt to compute C.

Mapping Between SHA1: and HTTP: URLs

In one embodiment, clients define and maintain their own mapping from particular contents to locations. For example, suppose r is the contents of Ricoh Innovations homepage. Then $r_u$ is http://www.rii.ricoh.com/ and R='c2c0bfe479dd6da1d58ec4d0c42c5c7c10a1acfe' (that is the hash value of 'Welcome to RII' which for this example is the entire contents of index.html=r).

In this case, a client might maintain an internal table with the following entries:

response to http://cache.com/A/. In this case, the path component of the HTTP: and SHA1:URLs that refer to the same document could be identical.

To retrieve an individual comment, the client might request http://cache.com/A/C (Again, note that cache.com may have access to and return c even if it does not have access to a.) If c refers to another document, b by location (e.g., HREF=HTTP://foo.com/b.html so $b_u$=HTTP://foo.com/b.html), then the client might be able to retrieve b from $b_u$, calculate B and locate the document log entries associated with B, via GET(SHA1:///B/). In one embodiment, by default the client checks and integrates log entries from several locations including the rendezvous point (the synchronizing server), its local cache, foo.com/b.html.xml, and so forth.

Of course, c might also specify that link by a SHA1:URL (e.g., $b_u$=SHA1:/B) in which case the client uses some mechanism for identifying the location from which to download the actual contents b if it did not already have b or an alternative HTTP: version of $b_u$.

Synchronization Between Two Nodes

In one embodiment, an individual client keeps a local cache of entries for each document. These may be stored in a hash table. The local cache may be any memory space or storage location. In one embodiment, the entry for each hash consists of 2 parts. The first part is either a string containing the actual content itself and/or one or more pointers to the actual content (if available), and the second part is a list of hash values that correspond to comments on this document. The client can be configured to check one or more places for lists of entries. In

| SHA1 (R) | HTTP: ($r_u$) | Notes |
| --- | --- | --- |
| c2c0bfe479dd | http://www.rii.ricoh.com/ | The "original" URL. (Note that the hash value has been truncated here to conserve space) |
|  | /cache/c2c0bfe479dd/file.html | a local copy of the document contents |
| /c2c0bfe479dd/ | http://www.rii.ricoh.com/rss.xml | A conventional place to find comments associated with a particular web site. |
|  | /cache/c2c0bfe479dd/rss.xml | Local listing of known entries on this document. |

Note that the hash values do not need to be of the same length. In particular, the more bits of the hash value that are specified, the more "secure" the value is. Therefore, in cases where an encryption key, K, is used to encrypt information in documents and/or their log entries as discussed herein as being based on the content and an identifier, I, based on the content, K and I could be different portions of the output of the same algorithm or they could be the output of different algorithms. That is, although I is the hash of x and K is the hash of I. Equally well, I could be the first 80 bits and K could be bits 81-160 of the same hash computation.

Note that there is no requirement for a node or server which stores, processes, presents, or adds to a document log for A to actually have access to the content a. However, by convention for a server, for example, cache.com, that actually does have a cache or copy of the contents of documents, it can provide those contents in response to requests for the document, such as http://cache.com/A, and provide the list log entries in one embodiment, a default location is a rendezvous point, or synchronizing server, which might be checked periodically, such as, for example, whenever the user views a document.

When the client obtains additional entries, e.g., the result of a GET operation, those entries are added to the local cache (consistency checks may be done to ensure that the content is equal to the hash value) and the local list of entries is updated to reflect the new entries. (Information such as the sequence number obtained from a synchronizing server may be used to order this list for presentation.)

Note that nodes in one embodiment of the system of exchange are symmetric. The only difference between a client and server is that the client is defined as the machine that initiates communication—using GET to retrieve an entry listing or POST to send a listing. Of course, different nodes (in particular ones that act as servers) might also differ in their configuration, most especially in whether or not will accept entries from particular nodes (clients).

Nodes might keep track of their communication with other nodes (either other clients or servers) and send only "new" entries to the other node (either via a POST or in response to a GET).

Also note that additional exchange protocols may be used, such as, for example, simply copying and appending the contents of two XML files that refer to the same document log into a single file.

Any number of XML representations could be used for the document log entries. FIG. 3 shows an exemplary sketch of a XML file that represents the log associated with document A. In addition to the content ("First comment on doc A"), each entry has a number of attributes that may be assigned by the originator of the entry or another node. In FIG. 3, the SEQ attribute is assigned by the rendezvous point server. This XML document itself would be returned in response to a query for the document log associated with A, by convention this query takes the form //rp.com/A/ where "rp.com" is the host name for the rendezvous point. (Other servers/hosts would return their own versions of this listing. The sequence numbers provided by the rendezvous point are designated as "canonical.") Note that the HREF attribute on an entry specifies a link to another document similar to the HREF attribute of an anchor ¿a href= . . . ¿<a href= . . . >tag in HTML. Likewise, the SRC tag is analogous to the SRC attribute of the HTML IMG tag and specifies the source of a thumbnail image representing the referenced document.

Another possibility would be to use the existing really simple syndication (RSS) schema. A simple extension to RSS that identifies the base document ("anchor") for the RSS feed would enable the uses identified herein. Alternatively, instead of extending RSS, existing fields in RSS may be used.

Merging comments is not an issue since comments are stored according to their hash value. Note that in addition to the (text) value, attributes such as, for example, author and date may be used in the computation of the hash value, C.

Figure 4:
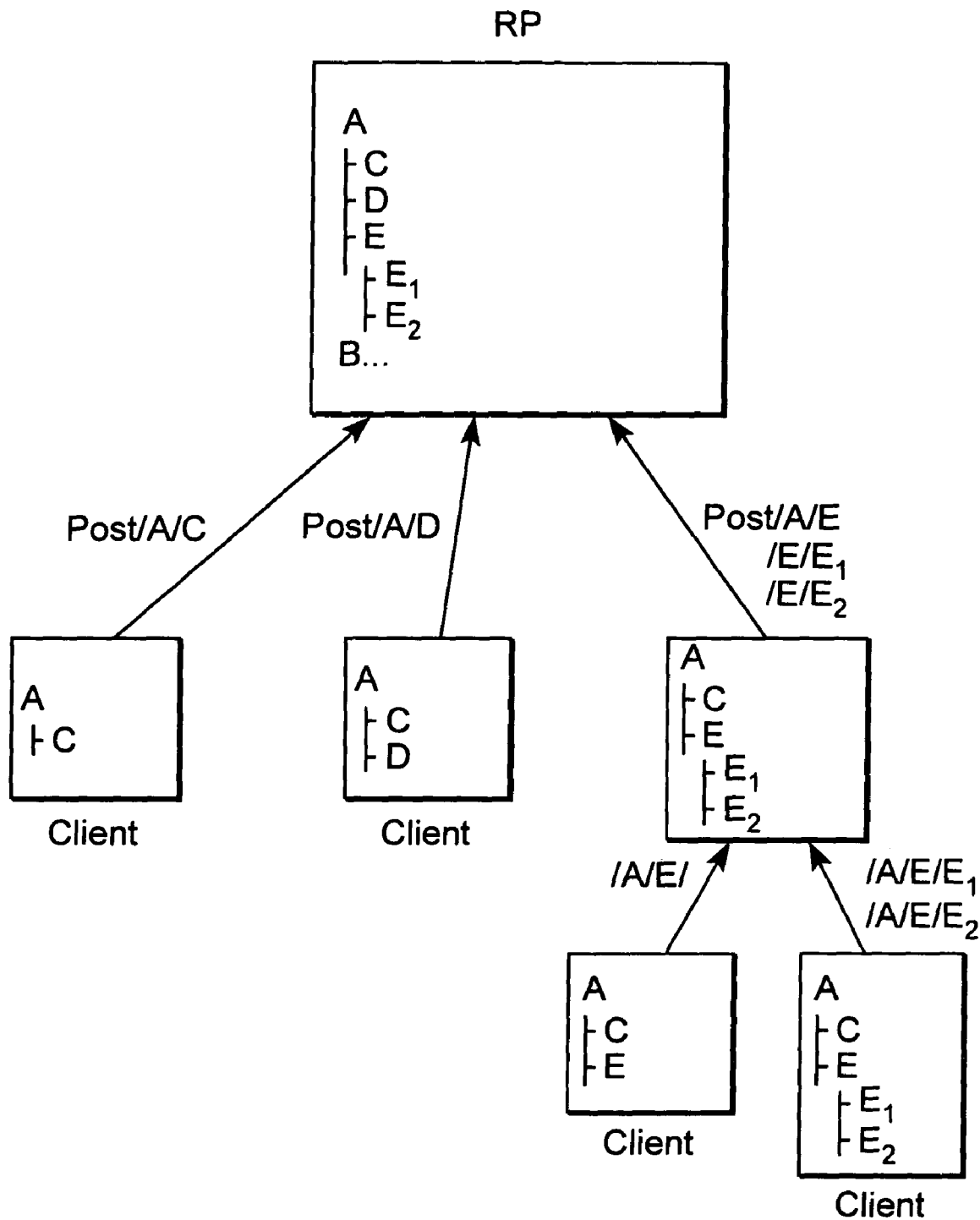
FIG. 4 is a diagram depicting the configuration of clients that submit entries to the rendezvous point for a particular document.

FIG. 4 is a diagram depicting the configuration of clients that submit entries to the rendezvous point for a particular document. Referring to FIG. 4, the overall diagram showing submission of entries from clients to the rendezvous point. Note that some clients may POST entries directly to the rendezvous point, while others may go through intermediary nodes. Since entries are referenced and stored by their hash values, any node can exchange entries directly with any other node without worry of a conflict. Individual nodes can also assign their own ordering to the sequence of entries. The ordering provided by the rendezvous point is, by convention, treated as the canonical ordering. Note that the original creator of a document might specify a rendezvous point or "root" for the log entries associated with that document by specifying the root or rp attribute of the initial ¿doc ..¿ element. Note however that a document log may be created by anyone, not necessarily just the creator of the document. (The creator of a document does have the first opportunity to register an initial log entry on the document.) Other nodes may or may not choose to use the root attributes specified in the document element. Document entries may be made while off-line and later automatically synchronize those entries with one or more servers.

The order of entries seen by the rendezvous point may differ from the actual creation order (especially if some clients are off-line at creation time). Also the intermediate nodes might aggregate entries from multiple other nodes and submit.

On the server side for the rendezvous point, in one embodiment, sequence numbers are assigned in the order in which they are received. Separate configuration and confirmation of user identity (e.g., posting authority) can be handled in any one of several ways. These include username and password verification, IP address testing, session identifiers, and the like. In some cases for encrypted content, the user might have to prove (through cryptographic methods) that they actually know the encryption key A (and/or the content a).

Rendezvous Points and Global Synchronization

As described, the arrangement of nodes above functions quite well for exchanging document logs in a decentralized, scalable, peer-to-peer arrangement. Comments can be made off-line or online and resolved through local exchanges.

However, a significant problem may arise when attempting to coordinate work between multiple clients. Many times those clients need to agree on an ordering or sequence of the entries. Because of simultaneous creation and communication lag times, it may not be possible to construct a unique ordering of those entries. Instead, each node may have its own unique ordering.

In one embodiment, a web service referred to herein as Rendezvous Point (RP.net) (RP.net is not an available domain name and used purely for example) provides a global ordering for any document log. In response to POST requests, such as, for example, POST(http://RP.net/A/C), RP.net assigns a sequence number to comment c in the context of document a. In response to a GET request, RP.net responds to GET(http://RP.net/A/) with a listing of known comments and specifies the sequence number for each comment.

In the same manner as servers other than the root domain name servers can provide DNS functions, in one embodiment, servers other than RP.net can provide sequence numbers. However, partners agree to use a single service as the canonical service for assigning sequence numbers. In one embodiment, the authority is delegated to other services, but the responsibility remains with the RP.net organization.

Thus, the server accepts metadata (e.g., a comment) and an identifier which may be the hash or other valued related to a digital object (e.g., the document being commented on) and, in one embodiment, the server assigns a sequence number to that metadata entry and publishes the updated list of sequence numbers and associated metadata entries. The server can publish either the entry content or identifiers calculated based on the content of the entries. Also, in one embodiment, the server digitally signs the published list. This may include the use of an encryption key.

Figure 5:
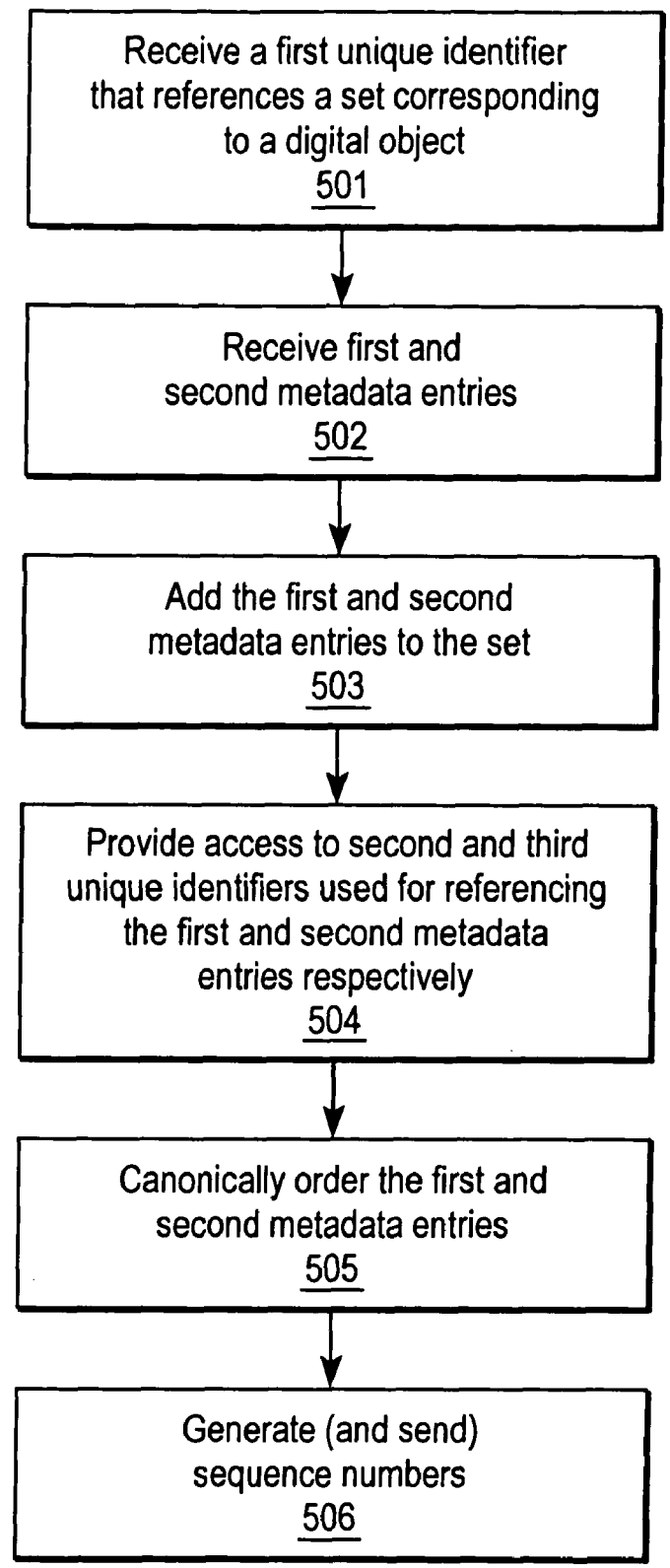
FIG. 5 is a flow diagram of one embodiment of a synchronization process.

FIG. 5 is a flow diagram of one embodiment of a synchronization process. The process is performed by processing logic that may comprise hardware (circuitry, dedicated logic, etc.), software (such as is run on a general purpose computer system or a dedicated machine), or a combination of both.

Referring to FIG. 5, the process begins by processing logic receiving a first unique identifier that references a set corresponding to a digital object (processing block 501). In one embodiment, the first unique identifier is computed based on content of the digital object. In one embodiment, the first unique identifier is a hash value that is a result of applying a hash function that maps an arbitrary sequence of bytes associated with the digital object into a fixed size sequence. Alternatively, the hash value is a result of applying a hash function on content of the digital object.

Note that the digital object may be indexed by the first unique identifier.

Processing logic also receives first and second metadata entries (processing block 502). Note that the sources of the first and second metadata entries may be different.

After receiving the first and second metadata entries, processing logic adds the first and second metadata entries to the set (processing block 503).

Once added, processing logic provides access to second and third unique identifiers used for referencing the first and second metadata entries respectively (processing block 504). The second and third unique identifiers are based on contents of the first and second metadata entries respectively. In one embodiment, the second and third unique identifiers are hash values. In one embodiment, the second and third unique identifiers are results of computing a hash value based on contents of the first and second metadata entries, respectively.

In one embodiment, providing access to the second and third unique identifiers comprises sending a canonical ordering of the second and third unique identifiers. In another embodiment, providing access to the second and third unique identifiers comprises sending sequence numbers associated the second and third unique identifiers, where each of the sequence numbers is associated with only one of the second and third unique identifiers. Note, instead of sending identifiers calculated based on the content, the content itself could be sent.

In one embodiment, the process further comprises canonically ordering the first and second metadata entries (processing block 505) and generating (and sending) sequence numbers (processing block 506) as described herein.

In one embodiment, the process further comprises accessing the first and second metadata entries using the first and second unique identifiers as indices. In one embodiment, the indices are hash values.

Figure 6:
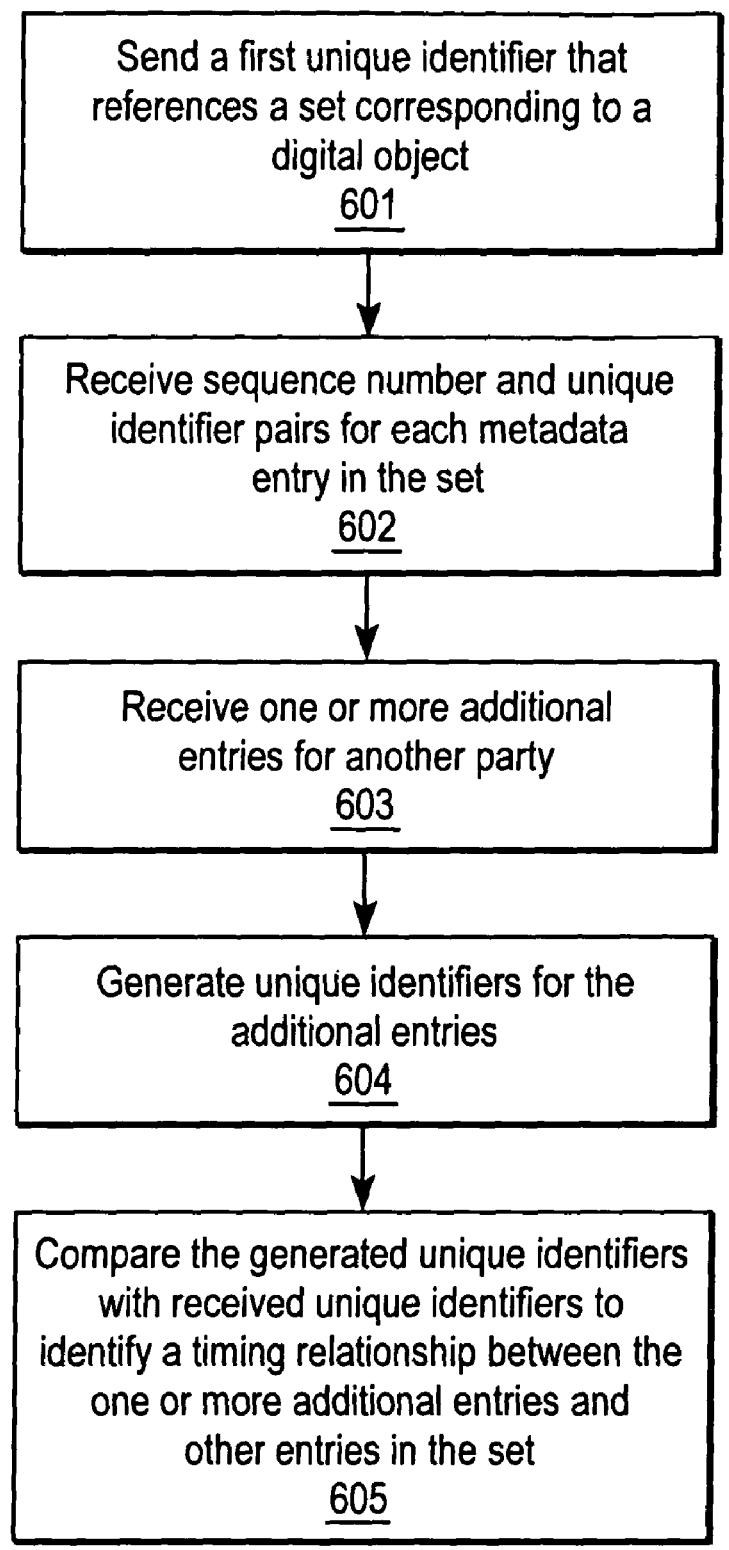
FIG. 6 is a flow diagram of one embodiment of a data process.

FIG. 6 is a flow diagram of one embodiment of a data process. The process is performed by processing logic that may comprise hardware (circuitry, dedicated logic, etc.), software (such as is run on a general purpose computer system or a dedicated machine), or a combination of both.

Referring to FIG. 6, the process begins by processing logic sending a first unique identifier that references a set corresponding to a digital object (processing block 601).

Processing logic then receives sequence number and unique identifier pairs for each metadata entry in the set (processing block 602). In one embodiment, the unique identifier in the pair is a hash value.

In one embodiment, the process further comprises receiving one or more additional entries from another party (processing block 603), generating unique identifiers for the additional entries (processing block 604), and comparing the generated unique identifiers with received unique identifiers to identify an order between the one or more additional entries and other entries in the set (processing block 605).

In one embodiment, the process may further include identifying a temporal location of the first unique identifier among unique identifiers in the set.

Tamperproof Logs

A tamperproof log is a sequence of metadata entries separated by "checkpoint hashes." The sequence begins with the document object identifier (hash of the document object). This is checkpoint hash #0.

In one embodiment, checkpoint hash #n is constructed by calculating SHA1(#n−1,entry_n), where #n is the previous checkpoint hash and entry_n is the nth entry. The #n−1 and entry_n are fed sequentially to the hash function to calculate the updated checkpoint hash, which is then added into the sequence.

Optionally, the checkpoint hash may include positional information, e.g., #abc:123, where abc represents the hash value and 123 corresponds to n (e.g., the $123^{rd}$ entry). Alternatively, 123 may correspond to the current byte position in the file. This makes it very efficient to locate a particular entry in a file given the corresponding checkpoint hash.

Applications of Document Logs

There are a number of applications that make use of the information stored in the document logs as well as the contents of the particular document. Some of these applications are given below.

Detecting Workflow by Analysis of Log Data

One application of document logs is to use information in the document log to detect a workflow. In one embodiment, analysis techniques are applied to the content of the document logs.

Figure 7A:
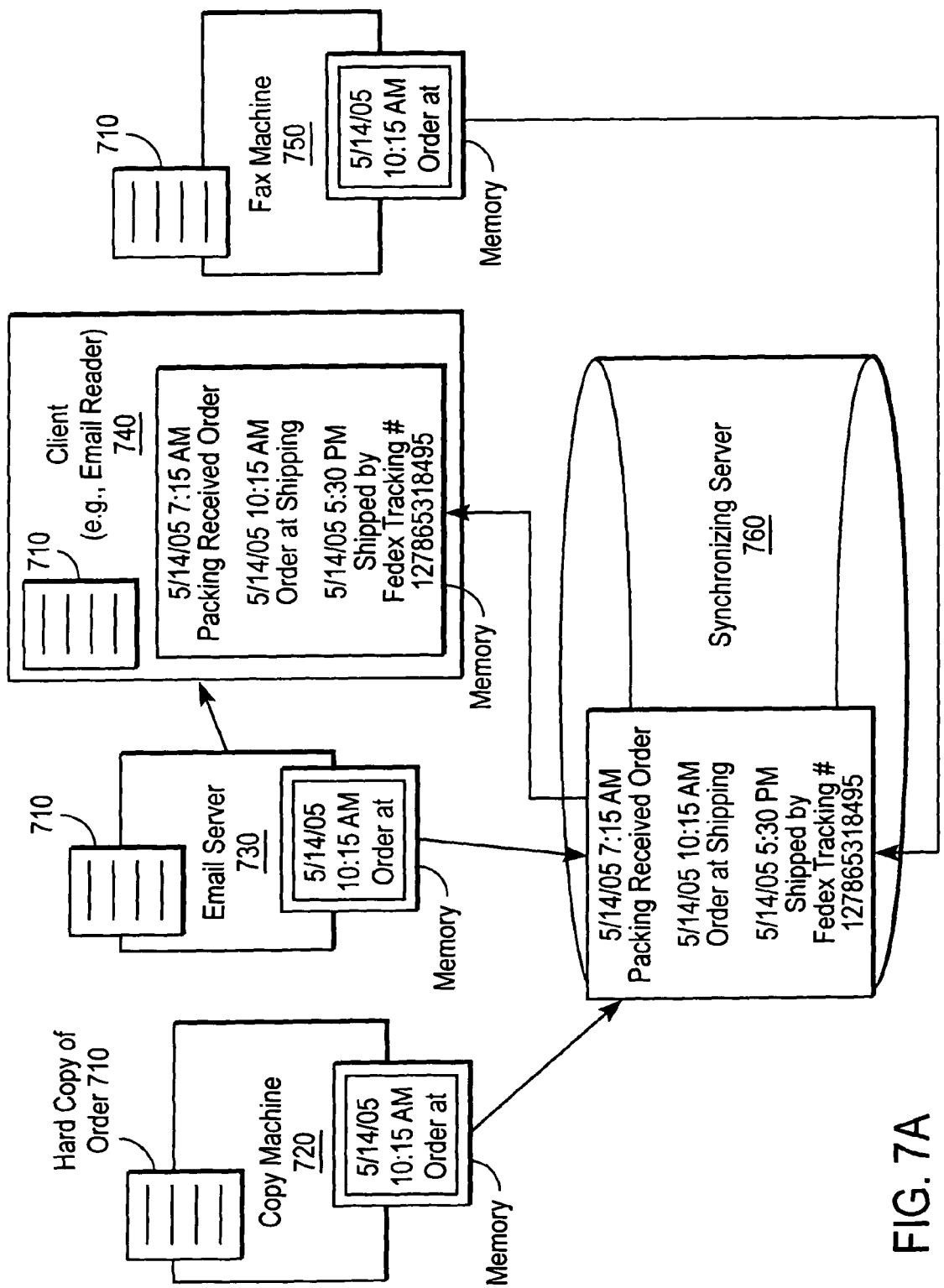
FIG. 7A illustrates an example of a workflow.

There are many types of workflows. One such example workflow is order processing. Other workflows include enrollment application forms, medical records/referrals, and images of documents and the associated transcriptions of those documents FIG. 7A illustrates an example of a workflow. Referring to FIG. 7A, a copy machine 720 makes an order that is stored in its memory. A hard copy of the order 710 is also shown. Email server 730 and fax machine 750 also include information regarding the order. Synchronizing server 760 synchronizes all the log entries corresponding to order 710. Client device 740, such as an email reader, accesses the synchronizing server 760 to obtain the document log corresponding to order 710. Client device 740 accesses the document log corresponding to order 710 by calculating its document identifier based on its content and sends the document identifier to synchronizing server 760, which accesses the document log corresponding to document 710.

Client device 740 may perform text analysis on the document log and based on the words and/or the order in which words occur in the log, client device 740 is able to ascertain that that order 710 is in order.

Figure 7B:
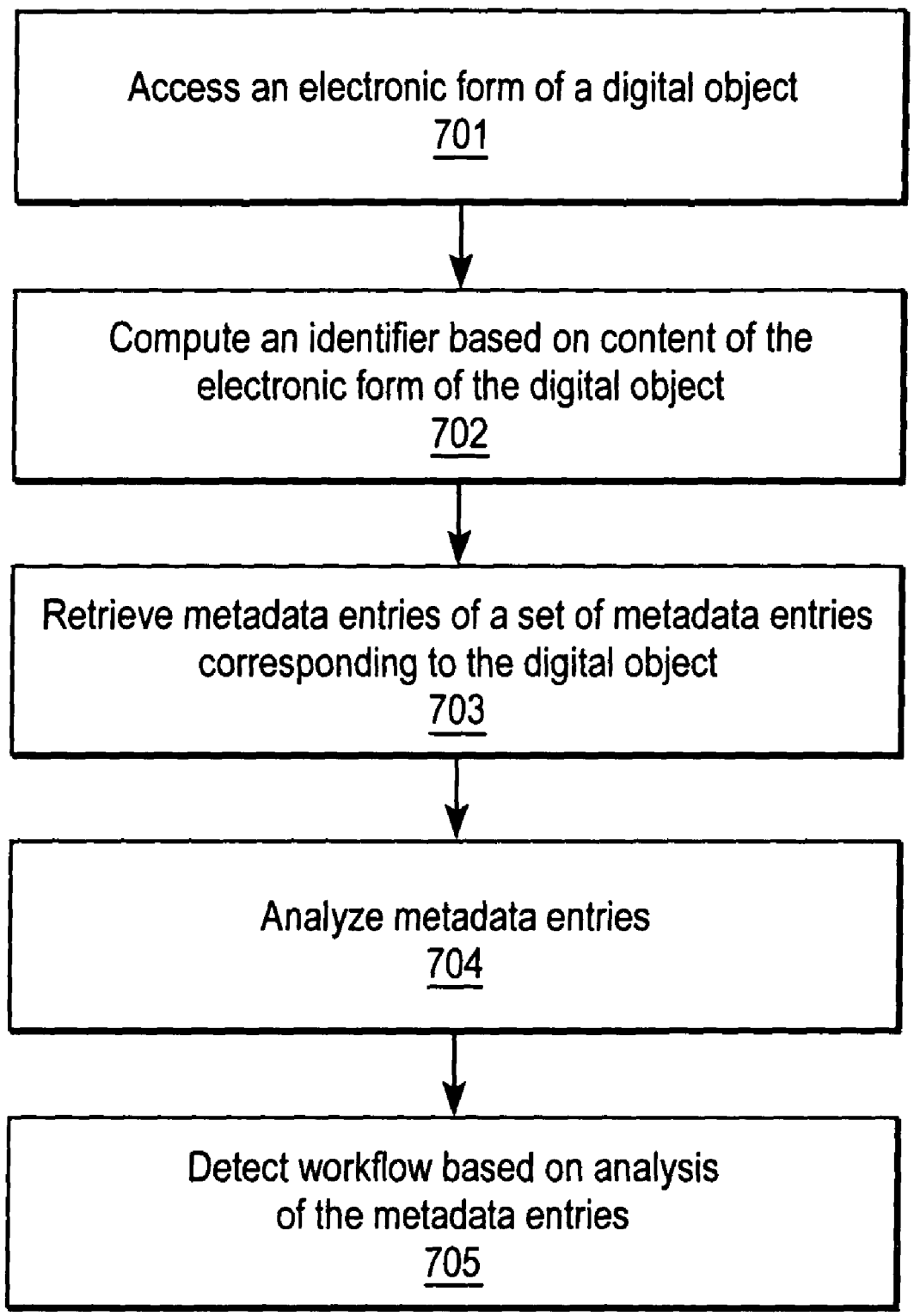
FIG. 7B is a flow diagram of one embodiment of a process for processing workflow information.

FIG. 7B is a flow diagram of one embodiment of a process for processing workflow information. The process is performed by processing logic that may comprise hardware (circuitry, dedicated logic, etc.), software (such as is run on a general purpose computer system or a dedicated machine), or a combination of both.

Referring to FIG. 7B, the process begins by processing logic accessing an electronic form of a digital object (processing block 701). In one embodiment, the digital object is a document.

Next, processing logic computes an identifier based on content of the electronic form of the digital object (processing block 702). As discussed above, the identifier may comprise a hash value.

After computing the identifier, processing logic retrieves metadata entries of a set of metadata entries corresponding to the digital object (processing block 703). In one embodiment, the set of metadata entries comprises a document log that is associated with, yet stored separately from, the digital object.

Once the metadata entries have been retrieved, processing logic analyzes metadata entries (processing block 704) and detects a workflow based on analysis of the metadata entries (processing block 705). In one embodiment, processing logic identifies pattern or patterns in logs entries as part of the analysis and detects the workflow based on any identified patterns. The patterns may include a set of one or more words associated with the workflow that appear in the log data. The patterns may include a set of words in an order associated with the workflow in the log data. In such a case, the set of words being in the order is indicative of the workflow. In one embodiment, the analysis may include performing pattern matching to identify the workflow. Thereafter, processing logic performs or more operations in response to detecting the workflow. In one embodiment, one such operation is the insertion of additional entries into a log. Other actions include performing a backup of the entries, and inserting or retrieving items from a database other operations including storing information to a memory location; sending an email; performing a remote procedure call via, for example, a) DCE, b) HTTP, c) HTTPS, d) CORBA; sending a text message; initiating a phone call; triggering a mechanical device; printing a document; and/or sending a fax.

In an alternative embodiment, the analysis includes analyzing data in a log for a different document. For example, patterns in entries are associated with documents A, B and C to infer sections likely to be associated with D. Thereafter, processing logic may detect a workflow based on patterns that repeat across different documents. In such a case, the workflow associated with all the documents or one can look at multiple documents to identify a workflow associated with one document. For example, in the case of detecting that many medical records are associated with one hospital admission. One could detect the admission just from noting that many records refer to it.

A simple example of detecting a workflow might be noticing a sequential pattern of authors that repeat for several documents. For example, the approval of purchase requests might consist of routine entries by Alice, Bob, and Charlie. The system might detect that Alice and Bob have made entries on a document and automatically present (or offer to present) that document to Charlie.

Coordination and Tracking of Legacy Workflow

Document logs and their associated metadata may be used to coordinate and track legacy workflows. This may be used to provide visibility into large, existing systems that are already in place to process orders (or perform other workflows). In one embodiment, this is performed by inserting checkpoint code into components (e.g., clients, servers, etc.) to perform various functions that record the results of performing a portion of the workflow. For example, checkpoint code may be inserted to calculate a document identifier and to post log entries. The document identifier may be calculated based on data flowing into/out of existing components. The checkpoint code may also be inserted to post the results associated with a processing stage of the workflow as a metadata entry added into a document log.

The arrangement in FIG. 7A may include the checkpoint code described above. For example, copy machine 720, email server 730, and fax machine 750 all may include checkpoint code that sends back data for log entries in the document log corresponding to different portions of the workflow that they perform. For example, anytime an order is copied, the checkpoint code running the copy machine 720 sends an electronic copy of the order to synchronizing server 760. Email server 730 operates by sending client 740 an email when an order is shipped. The checkpoint code on email server 730 may send a copy of that email to synchronizing server 760 to record the fact that order was shipping. Note that in one embodiment, the calculation of the hash is based on the content of the email and scans and/or reading of the barcodes in the images. Those bar codes contain identifiers of the data corresponding to the printed object.

Figure 8:
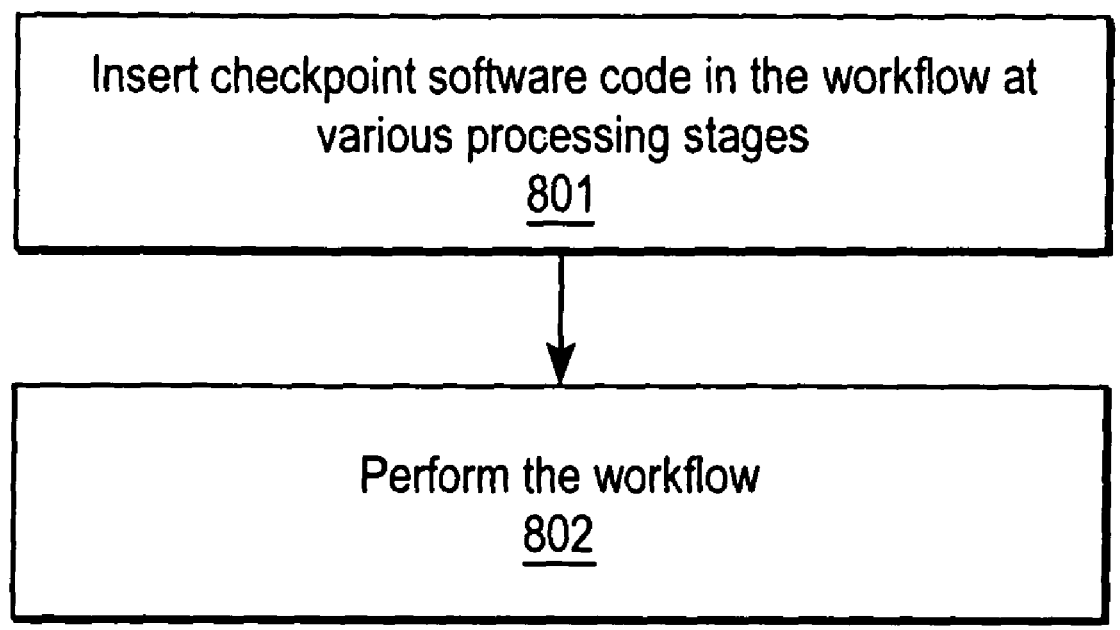
FIG. 8 is a flow diagram of alternative embodiment of a process for processing workflow information.

FIG. 8 is a flow diagram of alternative embodiment of a process for processing workflow information. The process is performed by processing logic that may comprise hardware (circuitry, dedicated logic, etc.), software (such as is run on a general purpose computer system or a dedicated machine), or a combination of both.

Referring to FIG. 8, the process begins by processing logic inserting checkpoint software code in the workflow at various processing stages (processing block 801). The workflow has two or more processing stages, and each of the processing stages includes one or more processing operations In one embodiment, if a processing stage creates a new object, entries are made for both the old object and the new object. The execution of some checkpoint code causes the addition of a metadata entry corresponding to a processing operation of a processing stage.

With the checkpoint code in place, processing logic performs the workflow (processing block 802). For each of the two or more processing operations, processing logic calculates an identifier and adds at least one metadata entry corresponding to each processing operation to a set of metadata entries (e.g., a document log) corresponding to a digital object (e.g., a document representing the workflow). In one embodiment, the identifier is calculated based on data being input into or being output from each processing operation or stage.

Refining Based on Log Content

In one embodiment, analysis techniques are applied to the content of the document logs. By doing so, metadata in the log entries are used to ascertain additional information about the digital object (e.g., document). First, the contents of document logs associated with a document may be used to infer a more precise understanding of the topic of that document. Second, the information stored in document logs may be used to display associated digital objects that are likely to be of interest.

In one embodiment, a document may be indexed based on the results of the analysis of the information in the document log. For example, a text retrieval engine may index the occurrences of words in a document log and allow searches to be performed on the index. Such searches may be performed using a Boolean combination of terms.

In another embodiment, documents may be searched and/or retrieved based on the results of analysis of the information in the document log. This may be particularly useful for document search engines that base their results on content, particularly those that use relationships among content to search for documents. In other words, the results of the analysis are metadata that can be used to support the operation of search engines.

More specifically, the information contained in document logs is valuable for disambiguating searches and for producing targeted references (described later below). For example, if a document that's most frequent and distinctive words are "shell", "sound", and "mix", by analyzing the contents, one might conclude that the document involves a programming task. For instance, the document might be discussing a shell script that manages audio input channels on a sound mixing system. However, consider that this identical document has document logs attached that include several comments from Donald Knuth, the author of the famous work on algorithms. Based on additional information, one is likely to conclude that the document involves the shell sort, a standard sorting algorithm used in many computer programs. Thus, the word "mix", which was first thought to be a term of art in audio processing, now appears likely to refer to the "MIX" assembly language used by Knuth to describe his algorithms. It is clear from the example that the information included in the document logs is quite rich in precisely the sorts of contextual information that can help disambiguate documents and topics from one another.

In one embodiment, a search may be performed using a browser page that supports the techniques disclosed herein. In one embodiment, such a browser page includes boxes for specifying a document identifier. Based on document identifier, the document log is accessed. Using the document log, a content search is developed based on an analysis (relevance) of the contents of document log by itself and/or the associated document. The results are returned and displayed in a browser page. In one embodiment, an interface is used that allows a user to enter a document identifier to retrieve a document. Then a separate link or user interface option is available on the display that allows a user to optionally have a search performed related to the document.

The following are examples of information that may be included in log entries, and may be of utility: entry author, entry contents, entry type, and entry sharing. The entry author may be useful because specific authors are more authoritative on particular subjects, and more likely to comment on topic areas of interest to them. The entry contents may be useful because log entries are likely to be quite revealing about the context in which documents are used. In the example above, the presence in the comments of the word "order", "comparison", and "log" would be strong evidence that the document involves sorting algorithms. The entry type may be useful because, in the above example, if there are several entries that follow known standards, a determination as to whether the work is associated with some sort of standards body may be made, or is an academic paper. The entry sharing may be useful because shared entries usually include valuable metadata. A shared entry is an entry that appears in two different logs (though it has the same hash since it is the same entry). If an entry is shared between an easily recognized document (i.e., The Art of Computer Programming—Volume 3) and a less well-known document (i.e., A Modified Shell), one would be able to infer a likely connection of topic for the less well known document.

In one embodiment, the information in log entries may be used to calculate the relevance of the associated documents for a particular purpose. The relevance may be in a form of a relevance metric. The information may include, for example, but not limited to, log entries, log entry authors, type of log entries, etc. Overlapping words in metadata entries is one example of relevance. The standard TFIDF (Term Frequency Inverse Document Frequency) text relevance calculator may be used to determine relevance.

The relevance may be calculated to determine if the associated documents are relevant to a search query. In cases of a search query, traditional methods to determine whether a document is relevant focus on the content of the document itself. However, using the content in the metadata for each entry in the document, additional information regarding the subject matter of a document may be obtained. Thus, when a search query is generated, the information in the document log is evaluated to determine if the document is relevant to the search, and if it is, the document is returned as a result to the search query.

As an example, the comments stored in metadata entries of a document log may receive a comment ranking based on a relevance metric calculated for it. Members of a set can be examined to check relevance compared to other set members. Related documents might include documents generated by the same source, documents containing the same keywords, etc. In one embodiment, any grouping of documents could be seen as related. Any set of comments, either from 'version' entries, 'author', 'type', or any other attribute can be used to aggregate a set.

Figure 9:
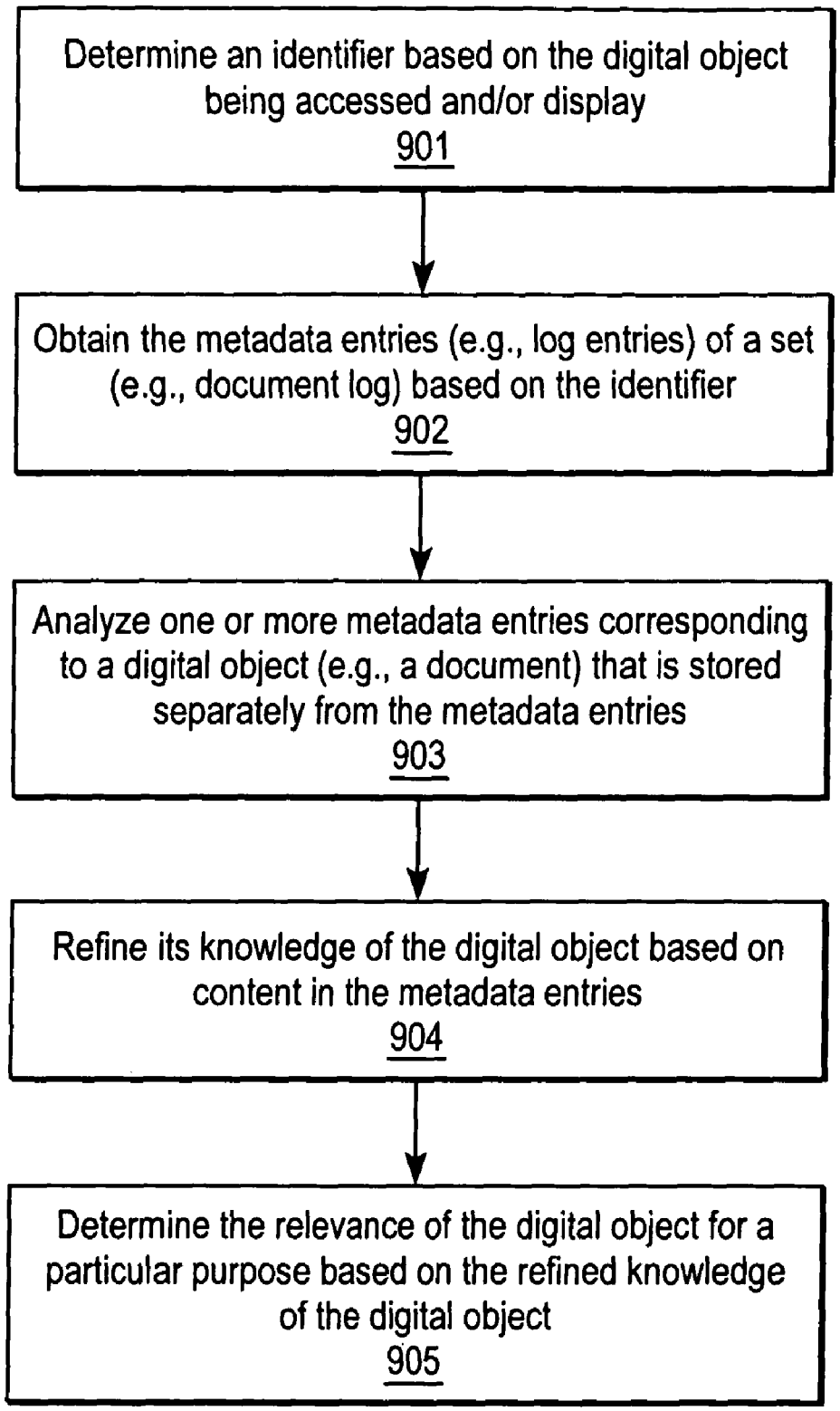
FIG. 9 is a flow diagram of an embodiment of a process for determining the relevance of a document.

FIG. 9 is a flow diagram of an embodiment of a process for determining the relevance of a document. The process is performed by processing logic that may comprise hardware (circuitry, dedicated logic, etc.), software (such as is run on a general purpose computer system or a dedicated machine), or a combination of both.

Referring to FIG. 9, the process begins by processing logic determining an identifier based on the digital object being accessed and/or display (processing block 901). As discussed above, the identifier is based on content of the digital object (e.g., documents). Using the identifier, processing logic obtains the metadata entries (e.g., log entries) of a set (e.g., document log) based on the identifier (processing block 902).

After obtaining the metadata entries, processing logic analyzes one or more metadata entries corresponding to a digital object (e.g., a document) that is stored separately from the metadata entries (processing block 903). In one embodiment, processing logic analyzes metadata entries by performing text analysis on the one or more metadata entries. The text analysis may be performed based on a word type, entry author, the time the entry was made, entry sharing, and entry type, all of which can be identifier in the metadata.

When performing text analysis, processing logic may apply different weight to different text features. For example, the authors of the log entries may be weighted higher than the type of log entries, and vice versa. This may include includes weighting known authors of a comments in the one or more metadata entries as more or less relevant than unknown authors of comments in the one or more metadata entries. For example, processing logic may weight authors commenting on the same digital object as more relevant. Also, with respect to authors, the weighting may be based on which parties commented on the same documents. For example, let's assume there were 90 documents and three people (P1, P2 and P3) that have commented on the documents. If both P1 and P2 commented on all 90 of the documents, yet both P2 and P3 only comment on three, the distance between the P1 and P2 is ¹⁄₉₀ and the distance between parties two and three is ⅓. Therefore, P1 and P2 are closer than P2 and P3. This fact may allow the weighting of certain comments to be modified based on who is making the comment.

After analyzing the metadata entries, processing logic refines its knowledge of the digital object based on content in the metadata entries (processing block 904). In one embodiment, processing logic analyzes the metadata to discern the topic of the digital object.

Based on the refined knowledge of the digital object, processing logic may perform an operation (processing logic 905). In one embodiment, processing logic determines the relevance of the digital object for a particular purpose based on the refined knowledge of the digital object.

In one embodiment, processing logic determines the subject matter of the document based on content of the metadata entries of the document log by itself or with the use of content from the document.

As discussed above, the information stored in document logs may be used to display associated digital objects that are likely to be of interest. This allows the displays to be adaptive. It is easy to imagine producing targeted reference or search results that are more precise simply because more information about potential topic is available. In one embodiment, after the refined knowledge of a document has been obtained from analyzing its relevance, a document display, including a search result page, may be annotated with targeted references to other documents. The display may be adaptive in that comments associated with a digital object may be automatically retrieved and displayed because of their determined relevance.

There are a number of ways to adapt the display. In one embodiment, for collection of documents, the size of thumbnail (or other image) depends on the number of comments that have been made and stored in the document log associated with the document. Alternatively, the size of the thumbnail may depend on the author(s) of comments in the document log, the density of connections between log entries, etc.

Figure 10:
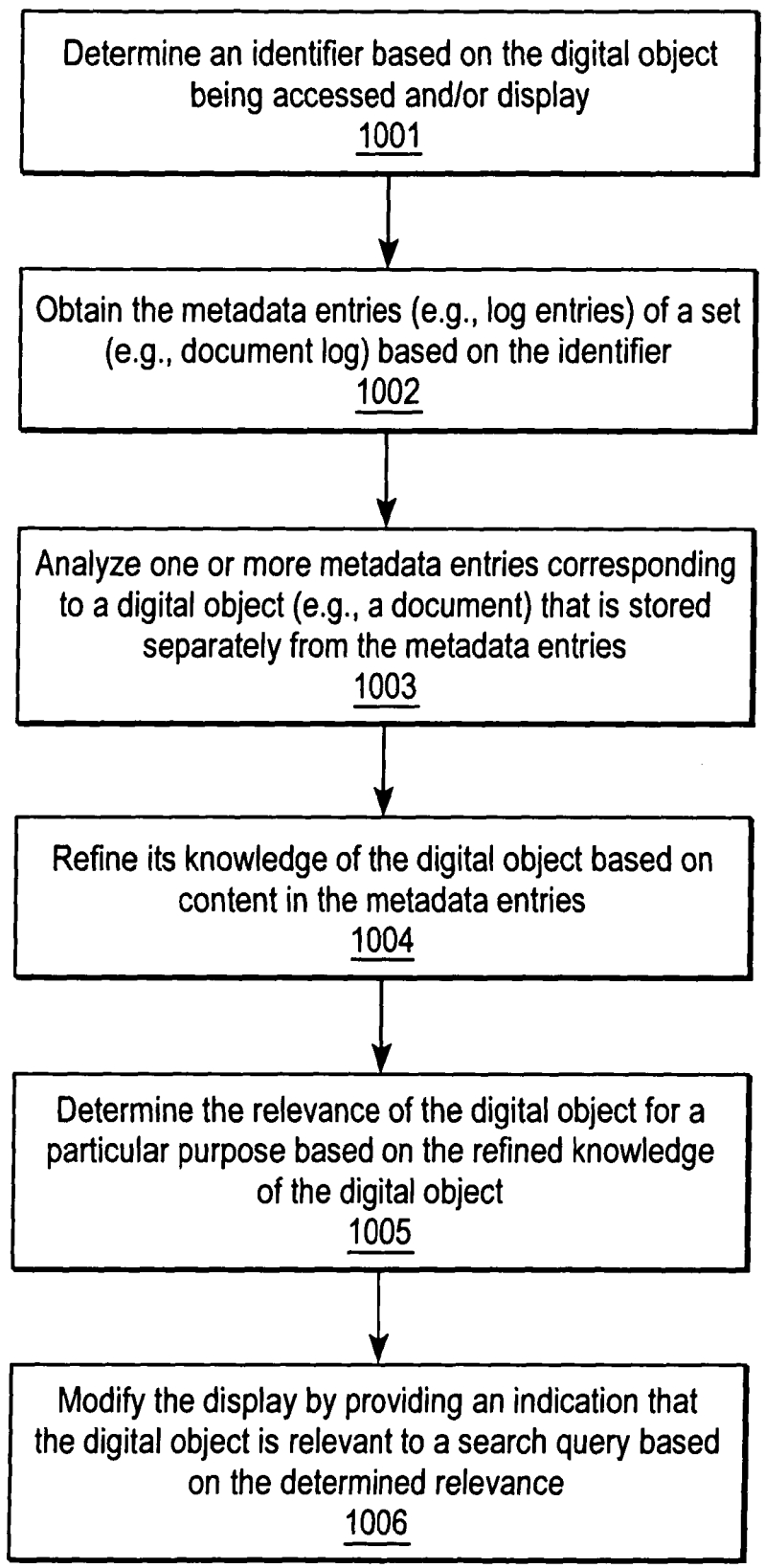
FIG. 10 is a flow diagram of an embodiment of a process for adapting a display based on information from the metadata entries in a document log.

FIG. 10 is a flow diagram of an embodiment of a process for adapting a display based on information from the metadata entries in a document log. The process is performed by processing logic that may comprise hardware (circuitry, dedicated logic, etc.), software (such as is run on a general purpose computer system or a dedicated machine), or a combination of both.

Referring to FIG. 10, processing blocks 1001, 1002, 1003, and 1004 are the same as processing blocks 901, 902, 903, and 904, respectively, of FIG. 9.

Based on the refined knowledge of the digital object, processing logic determines the relevance of the digital object for a particular purpose based on the refined knowledge of the digital object (processing logic 1005). Based on its determined relevance, processing logic modifies a display (processing logic 1006). In one embodiment, processing logic modifies the display by providing an indication that the digital object is relevant to a search query based on the determined relevance. In one embodiment, processing logic provides an indication that the digital object is relevant due to the one or more metadata entries being above a threshold. For example, the number of comments to the same document may be indicative of its relevance.

In another embodiment, processing logic modifies the display by displaying the digital object as part of displaying search results to the search query.

In yet alternative embodiment, processing logic may select information to display based on content in the metadata entries. Processing logic may select information to display by changing a display of one or more thumbnail images based on one or more criterion. The changes to the display may include clustering of one or more of the thumbnail images and changing thumbnail size of one or more thumbnail images. In one embodiment, the criterion is based on the number of comments in the metadata entries and/or on the number of cross references in the one or more metadata entries. A cross-reference is a link to another document either by URL or by hash identifier. In one embodiment, the cross reference refers to shared entries. Alternatively, the mention of an ID within an entry constitutes a cross reference.

In one embodiment, processing logic displays the digital object and its size is based on a number of comments. If the number of comments reaches a certain threshold number, the size of the digital object in the display is adjusted. For example, processing logic may display a document (digital object) at one size if the number of comments in the log is below the threshold and at another size larger than the first if the number of comments in the log is above the threshold.

Advertisements

Figure 11A:
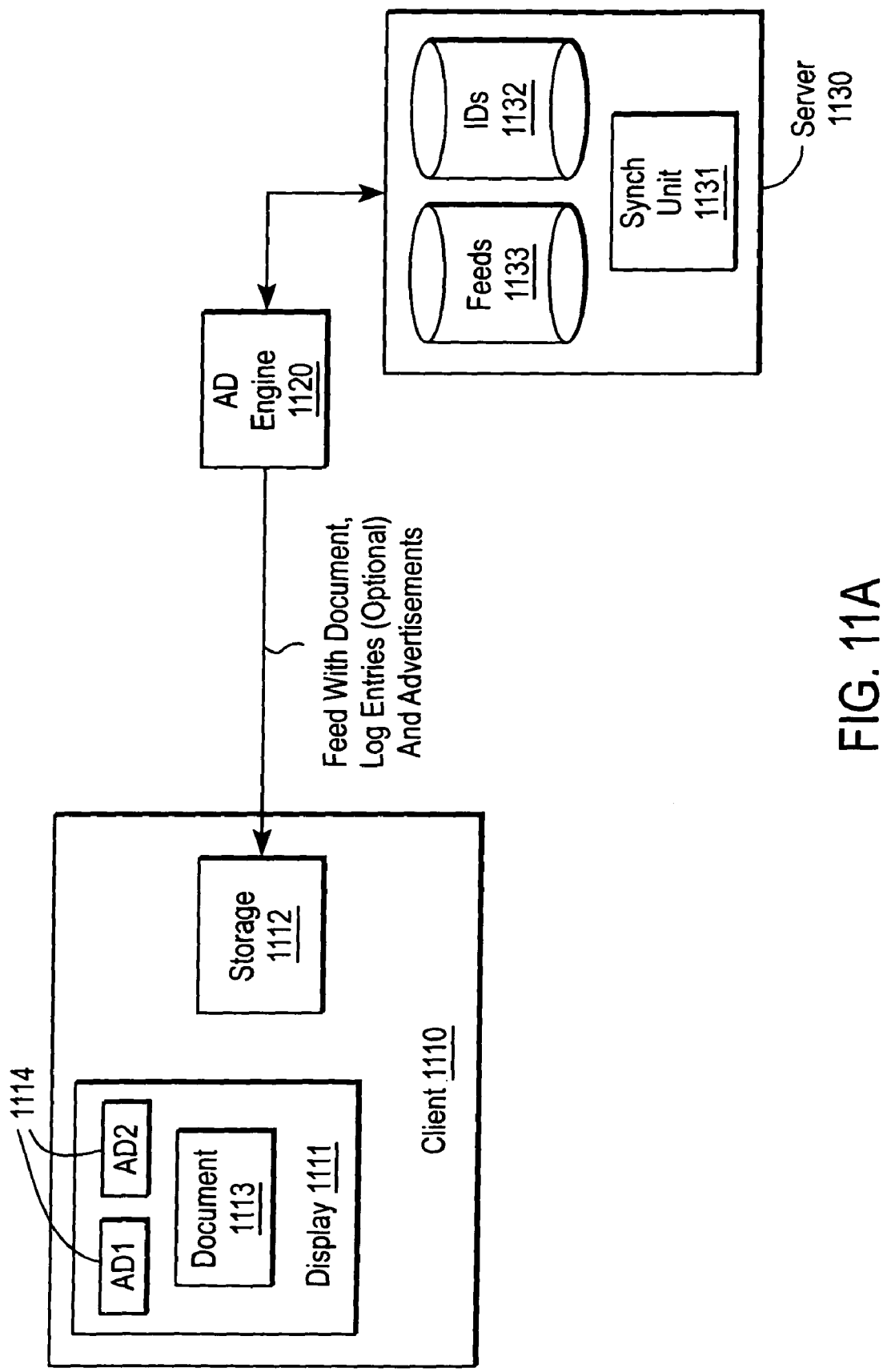
FIG. 11A is a flow diagram of one embodiment of a system to provide ads.

The knowledge obtained about the topic of a document using content of log entries by itself or along with the document content may be used to select and display targeted advertising. Search engine companies may use this technique to select advertisements. Such an arrangement is shown in FIG. 11A. Referring to 11A, a client 1110 includes a display 1111 and storage 1112. Display 1111 displays document 1113. In one embodiment, document 1113 was provided from server 1130. In an alternative embodiment, document 1113 is provided by another device. Ad engine 1120 uses a document identifier associated with document 1113 to access log entries corresponding to document 1113 and analyzes those log entries to determine what advertisements should be fed to other portions of display 1111 while document 1113 is shown. Thus, ad engine 1120 analyzes the comments that are associated with the log entries related to document 1113. Ad engine 1120 may also analyze the IDs of comment authors and the IDs of the viewer. Such IDs are stored in server 1130 and ID storage 1132. In one embodiment, the feeds from ad engine 1120 to client 1110 includes a document and its log entries (optionally), and these feeds come from feeds 1133 of server 1130. Ad engine 1120 analyzes these feeds and adds the advertisements into the feed. Synch unit 1131 synchs the ads, such as ad 1114, with document 1113 for use on a display 1111.

In one embodiment, to employ this technique, when a document is displayed, its identifier is automatically calculated and its log entries are accessed using the identifier as an index. An advertising space metric may be calculated based on the information in the log entries. Base on the metric, advertisements may be selected and displayed. In this manner, information from log entries may be to select advertisements to display in context of document (including relationship between viewer and log entry authors, actions, etc.)

Figure 11B:
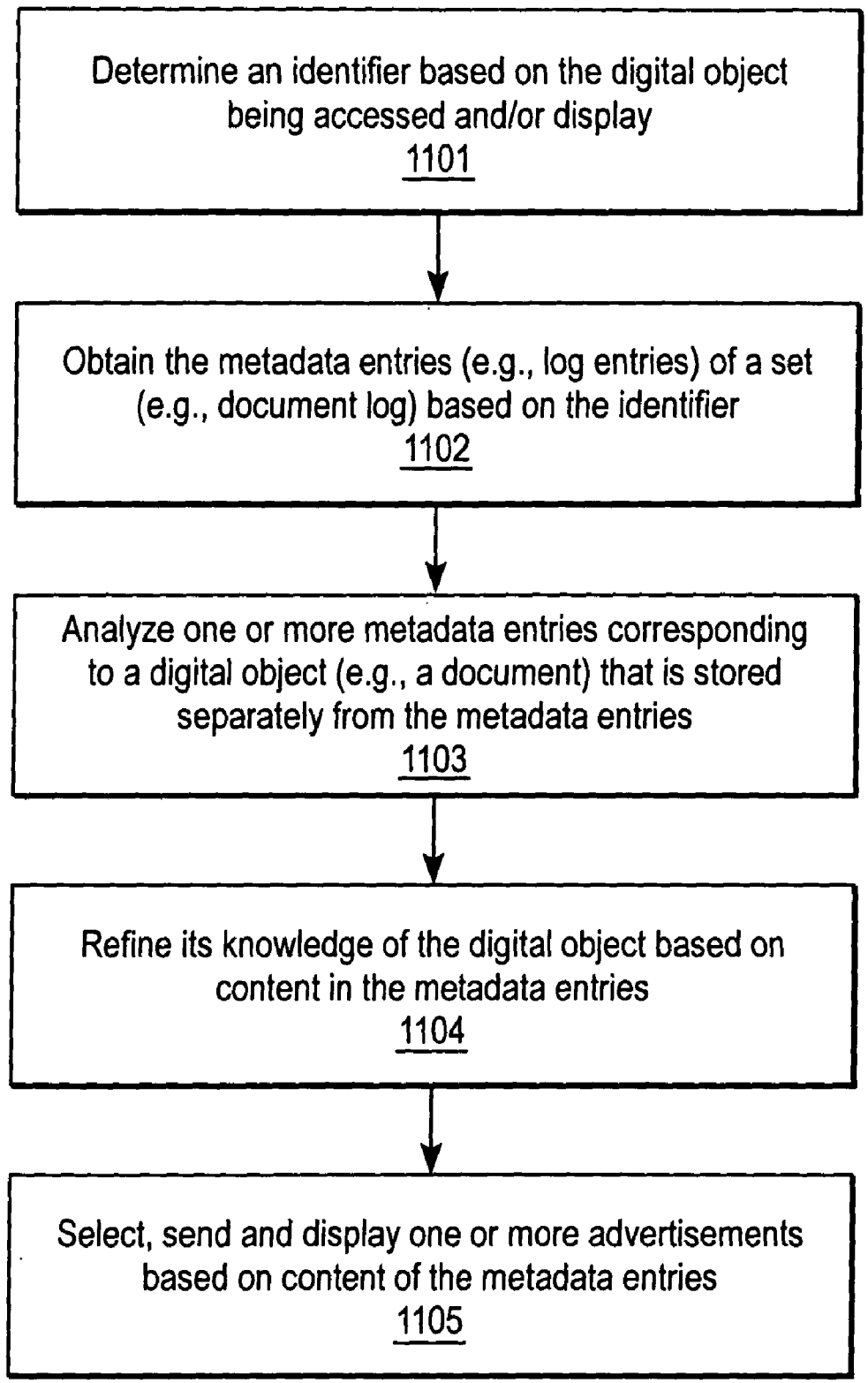
FIG. 11B is a flow diagram of an embodiment of a process for adapting a display to include advertisements selected and displayed based on information form the metadata entries in a document log.

FIG. 11B is a flow diagram of an embodiment of a process for adapting a display to include advertisements selected and displayed based on information from the metadata entries in a document log. The process is performed by processing logic that may comprise hardware (circuitry, dedicated logic, etc.), software (such as is run on a general purpose computer system or a dedicated machine), or a combination of both.

Referring to FIG. 11B, processing blocks 1101, 1102, 1103, and 1004 are the same as processing blocks 901, 902, 903, and 904, respectively, of FIG. 9. Based on the refined knowledge of the digital object, processing logic selects, sends and displays one or more advertisements based on content of the metadata entries (processing block 1105). In one embodiment, the selection of advertisements is based on one or more identifiers associated with one or more authors of comments in the one or more metadata entries. In an alternative embodiment, the selection of advertisements is based on an identifier associated with a viewer of comments in the one or more metadata entries. The advertising may also be based on the content of the document itself.

Providing References Based on Analysis of Log Content (Including Analysis)

The information in the logs may be used to produce likely references with little understanding of the topic. This might be useful for a document browser display to provide associated material when a document is being viewed.

Examples of the usefulness of this technique include, but are not limited to, the following. First, the technique may be used to obtain documents that have comments by the same author or documents with shared comments Also, this technique may be used to locate documents by authors who have commented on the currently displayed document. This would be a valuableaid in finding documents from authoritative sources.

Apart from authors, other metadata information may be obtained from the entries in a log. For example, the entry time of the document log may be used in combination with other log data. More specifically, comments by the author that occurred within a month of the entry time would give valuable insight into the biases of a particular author or the context under which the comments were made.

A still further use of the information in the log entries is to identify log entries whose document type matches a particular document type being sought. For example, if searching for receipts using an expense report system, this technique could be used to collect all receipts in a given document set because they contain authorization entries by the purchasing staff, even if the document content varied wildly from one receipt to the next.

Note that these kinds of searches are independent of the actual contents of the document itself to a large extent. They are useful to browsers and other search engines that attempt to bring up related material.

Figure 12:
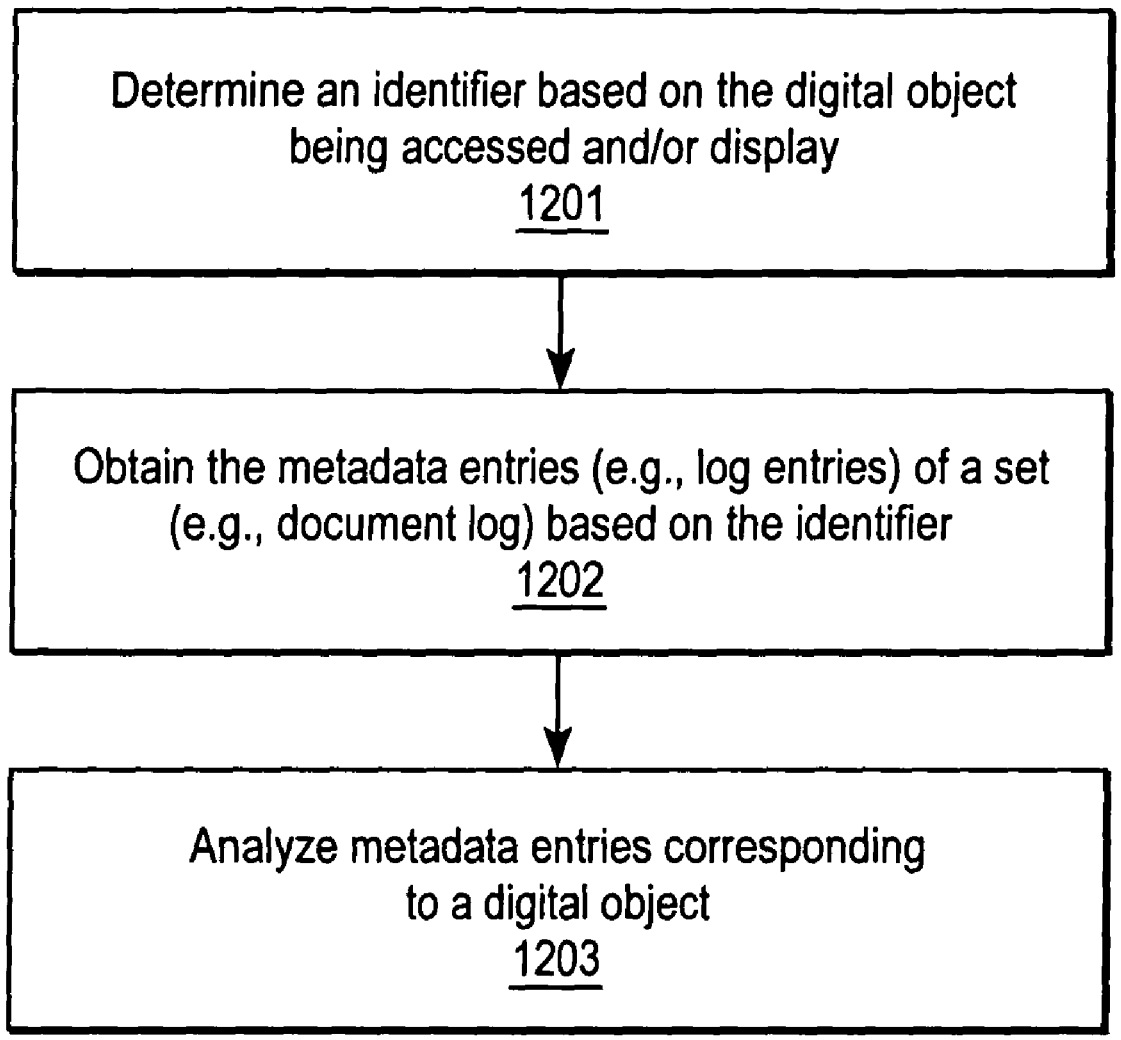
FIG. 12 is a flow diagram of an embodiment of a process for providing references to digital objects based on analysis of metadata in log entries.

FIG. 12 is a flow diagram of an embodiment of a process for providing references to digital objects based on analysis of metadata in log entries. The process is performed by processing logic that may comprise hardware (circuitry, dedicated logic, etc.), software (such as is run on a general purpose computer system or a dedicated machine), or a combination of both.

Referring to FIG. 12, the process begins by processing logic determining an identifier based on the digital object being accessed and/or display (processing block 1201). As discussed above, the identifier is based on content of the digital object (e.g., documents). Using the identifier, processing logic obtains the metadata entries (e.g., log entries) of a set (e.g., document log) based on the identifier (processing block 1202).

After obtaining the metadata entries, processing logic analyzes metadata entries corresponding to a digital object (e.g., a document) (processing block 1203). As discussed above, the metadata entries are stored separately from the digital object.

In one embodiment, processing logic analyzes data in metadata entries by determining relevance of the document. In one embodiment, processing logic determines relevance by searching for keywords in the content in the one or more metadata entries in the set. Alternative, the relevance may be based on content in the one or more metadata entries in the set. The relevance may be determined by calculating relevance metrics based on content in the one or more metadata entries in the set. These relevance metrics may include term frequency and inverse document frequency.

In one embodiment, processing logic analyzes metadata entries by performing text analysis on the one or more metadata entries. The text analysis may be performed based on a word type, entry author, the time the entry was made, entry sharing, and entry type, all of which can be identifier in the metadata. When performing text analysis, processing logic may apply different weight to different text features.

After analyzing the metadata entries, processing logic provides references to other data based on analysis of content in the metadata entries (processing block 904). The references may be to the digital objects that were identified based on the analysis performed (e.g., relevance metrics, keyword analysis, etc.) and/or other metadata associated with those digital objects. In one embodiment, processing logic may identify digital objects of one or more authors that provided comments on a currently displayed document. In such a case, processing logic may provide references to other data based on analysis of content in the metadata entries by displaying information on the identified digital objects (e.g., documents). In one embodiment, the information comprises a link for each identified digital object. In an alternative embodiment, the information comprises a thumbnail (or other type of) image corresponding to each identified digital object.

Always On/Always Updated

The techniques described herein may be exploited with mobile devices such as, for example, cellular phone and personal digital assistants (PDAs). These devices may access the metadata in the document logs or receive feeds of the metadata entries, including updated or new entries.

Figure 13A:
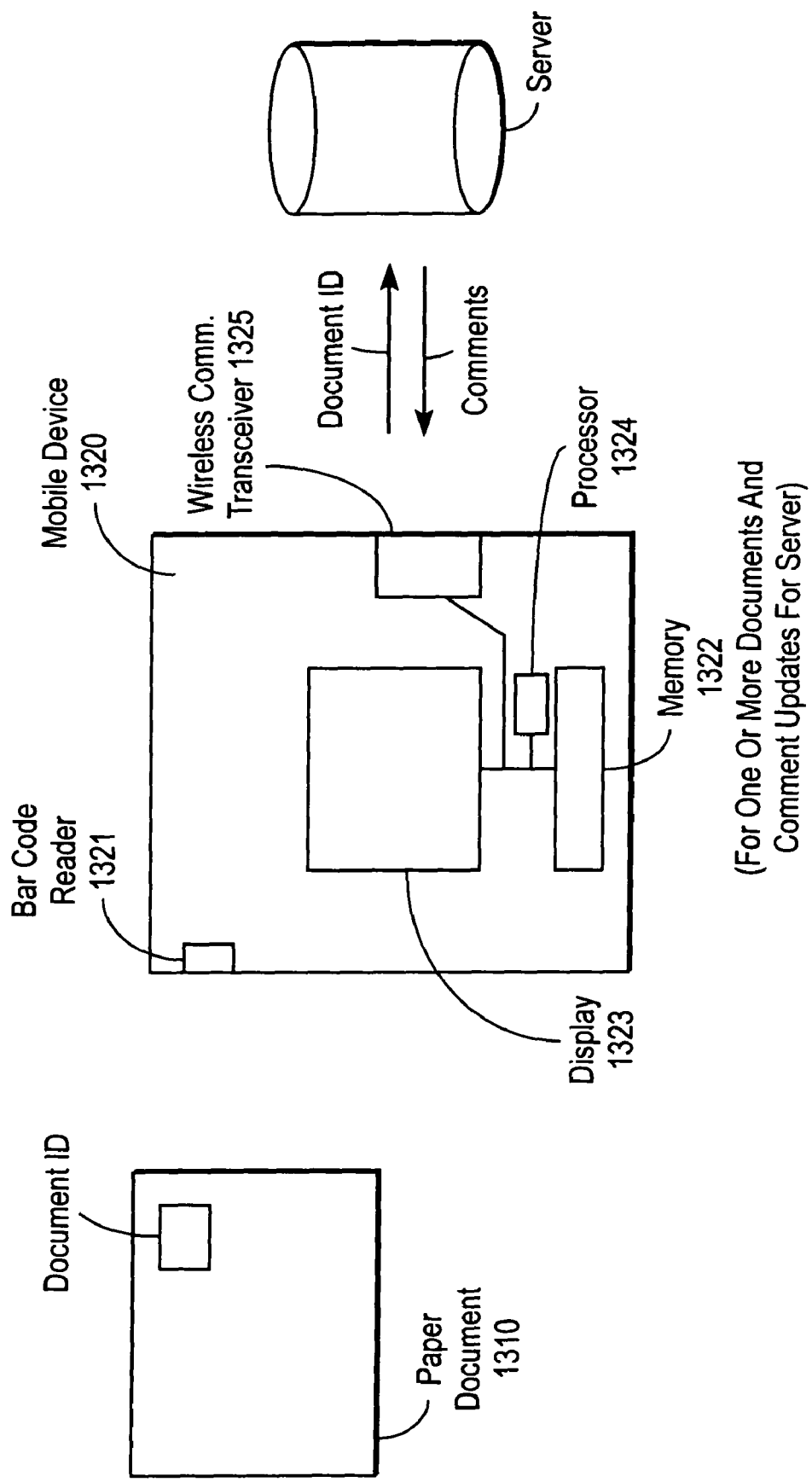
FIG. 13A illustrates an arrangement with a mobile device receives feeds from the server.

FIG. 13A illustrates an arrangement with a mobile device receives feeds from the server. Referring to FIG. 13A, mobile device 1320 scans a document ID from paper document 1310 using a machine code reader (e.g., bar code reader 1321) and calculates the document identifier. Mobile device 1320 sends the document ID to the server using wireless transceiver 1325. In response, the server sends the comments and/or other metadata from log entries to mobile device 1320, which receives them using wireless transceivers 1325. These may be stored in memory 1322. (Memory 1322 may also store instructions to control operations of mobile device 1320.) Mobile device 1320 then automatically shows the latest comments (e.g., the new version available of the document log) on display 1323. In one embodiment, mobile device 1320 subscribes to receive the associated document log (regularly polls server when online) and stores the latest comments in a cache for off-line viewing.

Notes taken on mobile device 1320 are posted to a document log. If off-line at the time the comments are made, then mobile device 1320 locally caches the comments until connected again. When a new version of a document is created, a new hash identifier is generated. The system can automatically add entries into the log for the old identifier containing a link to the new identifier pointing, and vice versa. In this case, a link for a version is a log entry that references an earlier version by its document ID. Such a version may be an edit or just a printed version. The operations of mobile device 1320 are controlled by processor 1324.

Figure 13B:
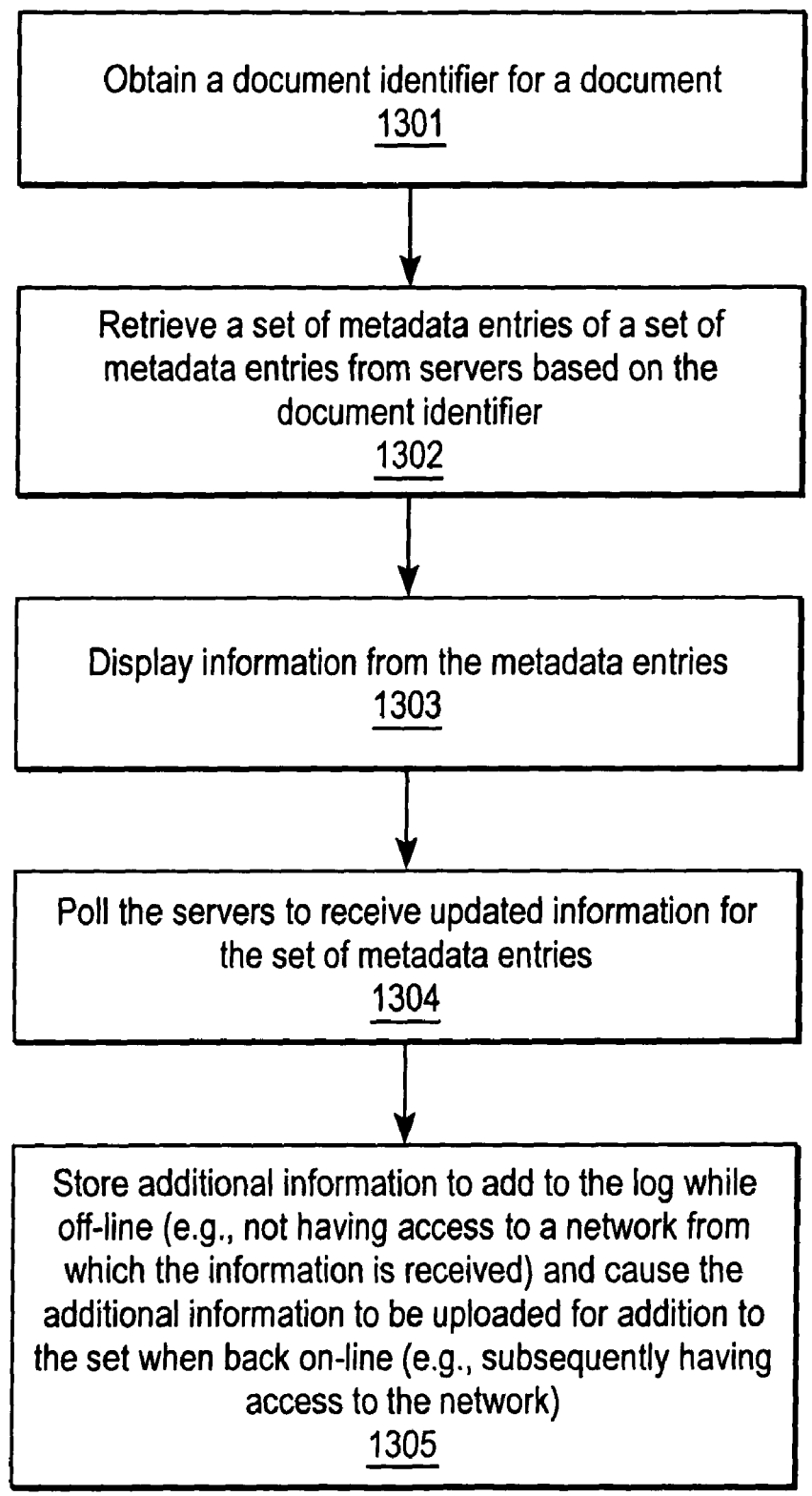
FIG. 13B is a flow diagram of an embodiment of a process for managing log entries.

FIG. 13B is a flow diagram of an embodiment of a process for managing log entries. The process is performed by processing logic that may comprise hardware (circuitry, dedicated logic, etc.), software (such as is run on a general purpose computer system or a dedicated machine), or a combination of both.

Referring to FIG. 13B, the process begins by processing logic obtaining a document identifier for a document (processing block 1301). In one embodiment, processing logic obtains the document identifier by scanning a machine-readable code (e.g., barcode) from a paper version of the document. In another embodiment, processing logic obtains the document identifier by selecting the document identifier from a list of one or more document identifiers.

After obtaining the document identifier, processing logic retrieves a set of metadata entries of a set of metadata entries from servers based on the document identifier (processing block 1302). In one embodiment, the metadata entries having information (e.g., comments) corresponding to the document; and Once the metadata entries have been obtained, processing logic displays information from the metadata entries (processing block 1303).

Optionally, processing logic may periodically poll the servers to receive updated information for the set of metadata entries (processing block 1304). In one embodiment, the periodically polling of the servers occurs only if user is a subscriber. The polling may occur upon receiving a request from a subscriber to receive the feed of information from the metadata entries in the log.

Optionally, processing logic may storing additional information to add to the log while off-line (e.g., not having access to a network from which the information is received) and cause the additional information to be uploaded for addition to the set when back on-line (e.g., subsequently having access to the network) (processing block 1305).

Unwinding Document Identifiers to Obtain Associated Content

The techniques described herein may be used to associate document identifiers with the digital object (e.g., the document) which they correspond. That is, in the case where one has a preexisting document identifier and multiple digital objects, the individual is able to identify the document associated with the document identifier by calculating document identifiers for each of the document. Then, a match may be made between the preexisting document identifier and one of the generated document identifiers. Based on the match, the digital object corresponding to the preexisting identifier is identified.

Figure 14:
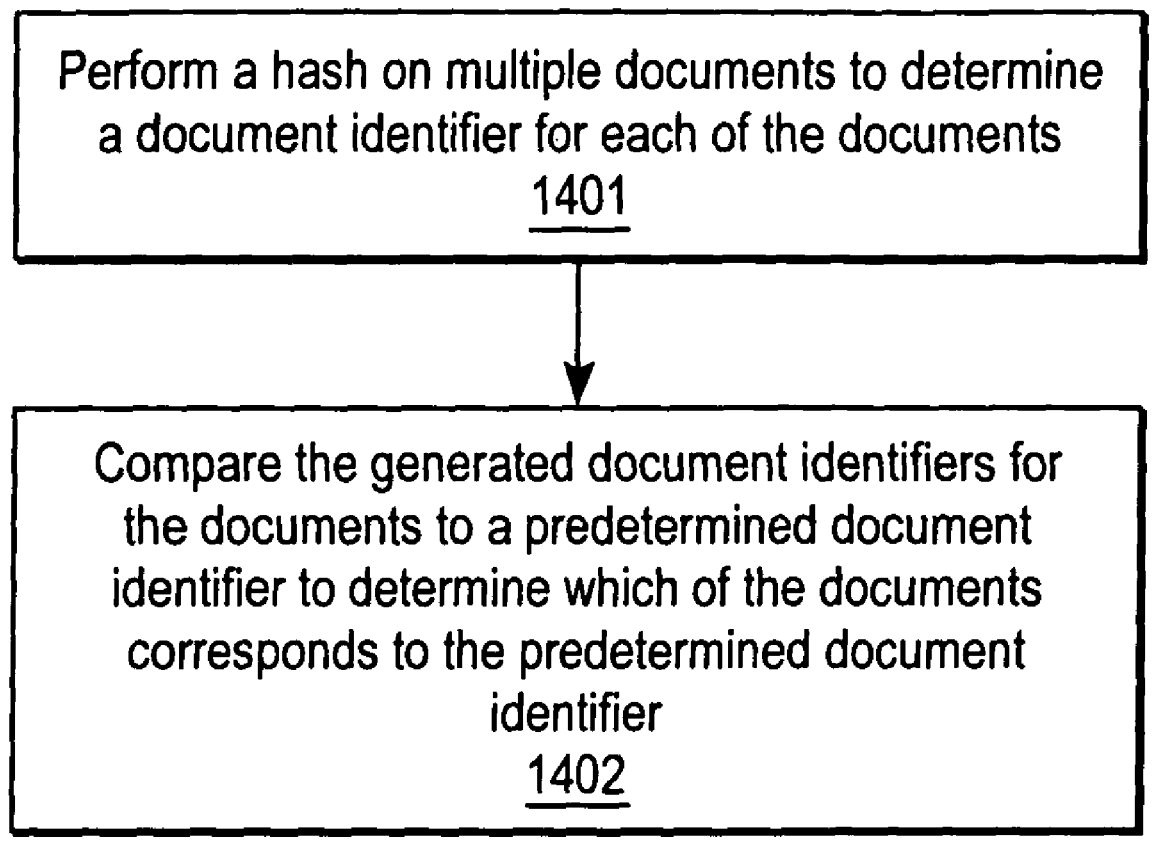
FIG. 14 is a flow diagram of an embodiment of a process for determining a digital object that corresponds to a received document identifier.

FIG. 14 is a flow diagram of an embodiment of a process for determining a digital object that corresponds to a received document identifier. The process is performed by processing logic that may comprise hardware (circuitry, dedicated logic, etc.), software (such as is run on a general purpose computer system or a dedicated machine), or a combination of both.

Referring to FIG. 14, the process begins by processing logic performing a hash on multiple documents to determine a document identifier for each of the documents (processing block 1401). Then, processing logic compares the generated documented identifiers for the documents to a predetermined document identifier to determine which of the documents corresponds to the predetermined document identifier (processing block 1402).

References Between Documents

A user interface may be used to make references between documents. In one embodiment, a log creation page is used for this purpose. The log creation page may be used to obtain content through the use of a drop-down menu or to search for content from the content that it is obtained when an ID is calculated for the content. A portion of the screen includes one portion that shows a preview of the content and another portion is a location to make log entries. If a document has a previously existing log associated with it, another document log may reference that document (which may be a document log itself). This causes references to be input in both. Anytime another reference to a document is added into a document log, it automatically puts a reference in both documents logs to each other. Thus, there is an entry that is added to two logs simultaneously and the logs point to each other. For example, if a command line copy tool is used and copies a file to a location, when the copy is performed, the command line copy tool automatically puts entries using the hash as the ID for the file name for that directory, and to each directory, it puts a log for each file and indicates that it moved a copy of the files to this other location.

It also indicates this fact that both in the content of the recurring file as well as the name and ID associated with the new file. This is similar to the legacy workflow application described above in that multiple links may be automatically added to create another version of content (e.g., adding check points).

When an entry is posted on a server, the user indicates the digital object which is the basis of the comment and gives the server the URL of the digital object. The server contacts another server and indicates that the user is making a comment on the digital object associated with the URL. Using the server-to-server communication, two entries can be made into the log for two documents and those logs are replicated in normal fashion.

To register content, a copy of the content is obtained, and its URL is calculated and sent over. The file system, in response to a rename or move operation, uses a local cache to map the current document file name to the identifier. Before a move is performed (or anything else to the file), the hash of identifier on that file is calculated, compared to the current listed version. If it's different, an entry is added into the log saying that this is the new version. If some action is performed on it, another entry is added that indicates the action that was performed on the document. This may be done by the web browser instead of specifying the URL or the document identifier.

System for Log Integrity Verification

In one embodiment, a system verifies the integrity of log entries. This would be valuable in cases where logs are being used to store critical transaction records. For example, the order of checks and deposits in a check register is of critical importance in determining whether an overdraft has occurred.

Document logs can have their order and contents verified by employing one-way hashing functions. When a log is first generated, a large random number m is chose. This number is stored as clear text information in the log, along with the first entry. A one way hashing function, such as SHA1, MD5, or any of a number of others, is used to produce a hash of the concatenated contents of the log entry e and random number m. This new value is referred to herein as the check hash of the entry.

Each time a new entry is made, the check hash of the previous entry is concatenated to the contents of the entry, and a new check has is generated using the same hashing function noted above. Thus, each log entry will include a number that is derived in an easily verified way from both the content of all previous entries (the check hash of the previous entry) and its own content. Any log entries whose base documents are themselves log entries should use the check hash of the parent entry to generate their own contents.

Note that these check hashes are independent of the log entry contents, and should not be used in the computation of the document content hash.

These check hashes are useful for verifying the sequential contents, but it will be clear to one skilled in the art that a log could be modified by simple changing an entry and then recomputing the check hashes for all succeeding entries. However, it is also clear that any given log could store entries which could record the contents of another log and the check hash seen at the same time.

For example, consider two logs a and b. Each is verifiable as to content and sequence using its check hashes. Let us assume that an attacker wishes to alter item 2 of log b. The attacker modifies the entry, and recomputes the proper check hash for the new log entry. He then repeats the process for all succeeding entries of log b. Now log b is changed, but it is not detectable by examining the check hashes.

However, if an entry in log a refers to some entry of log b, including the sequence number of the entry in b and the check hash of that entry in log b, then the attacker has a new problem. Now he must change log a as well, in order to escape detection. This is possible using the same techniques noted above.

Now consider the case where there are many logs any of which may refer to another log's check hashes as noted above. If the attacker has no method of finding all logs or no access which refer to the log under attack, then the attacker will find it impossible to successfully alter all of the necessary logs to avoid detection.

An Example of a Computer System

Figure 15:
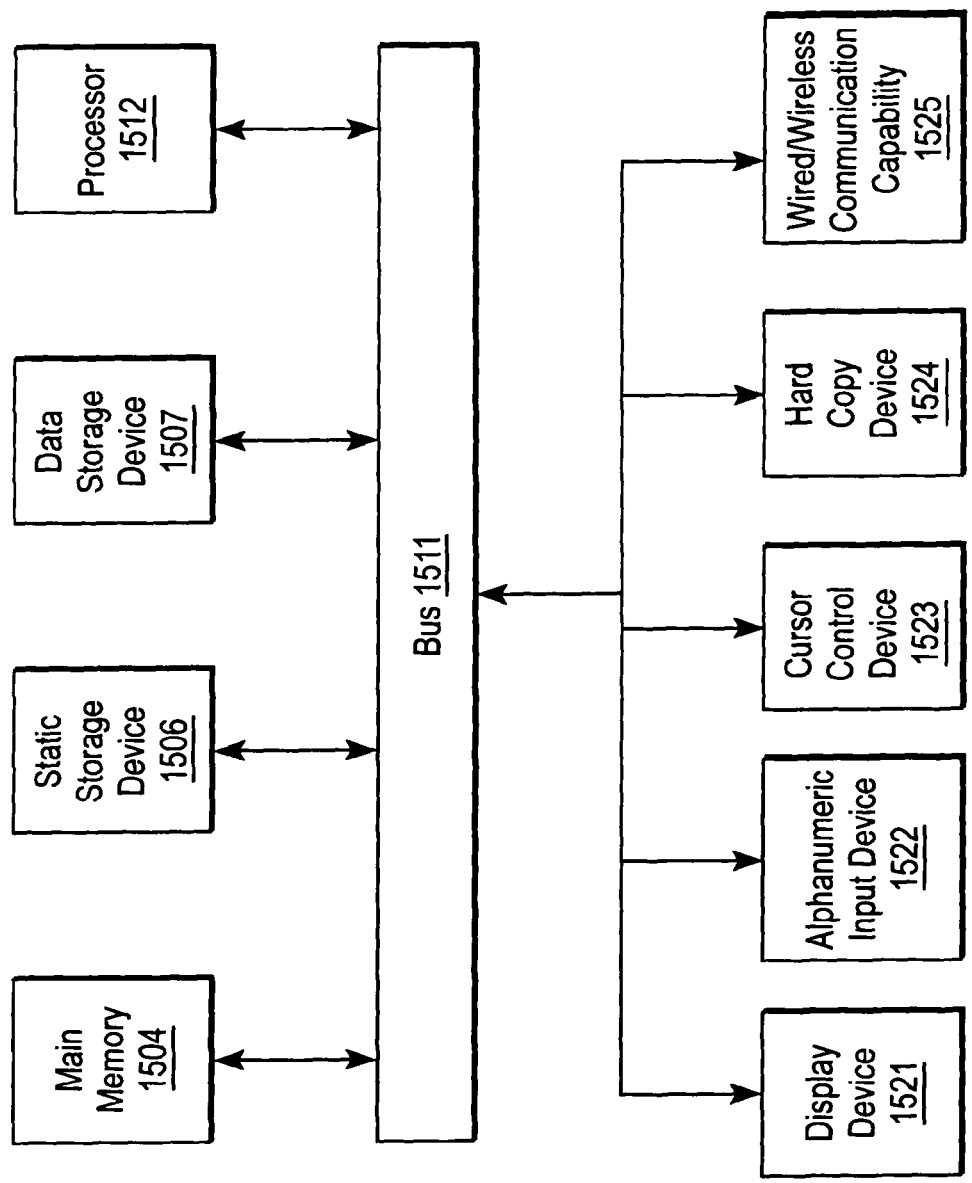
FIG. 15 is a block diagram of an exemplary computer system.

FIG. 15 is a block diagram of a computer system that may perform one or more of the operations described herein. Referring to FIG. 15, computer system 1500 may comprise an exemplary client or a server computer system. Computer system 1500 comprises a communication mechanism or bus 1511 for communicating information, and a processor 1512 coupled with bus 1511 for processing information. Processor 1512 includes a microprocessor, but is not limited to a microprocessor, such as, for example, Pentium™, etc.

System 1500 further comprises a random access memory (RAM), or other dynamic storage device 104 (referred to as main memory) coupled to bus 1511 for storing information and instructions to be executed by processor 1512. Main memory 1504 also may be used for storing temporary variables or other intermediate information during execution of instructions by processor 1512.

Computer system 1500 also comprises a read only memory (ROM) and/or other static storage device 1506 coupled to bus 1511 for storing static information and instructions for processor 1512, and a data storage device 1507, such as a magnetic disk or optical disk and its corresponding disk drive. Data storage device 1507 is coupled to bus 1511 for storing information and instructions.

Computer system 1500 may further be coupled to a display device 1521, such as a cathode ray tube (CRT) or liquid crystal display (LCD), coupled to bus 1511 for displaying information to a computer user. An alphanumeric input device 1522, including alphanumeric and other keys, may also be coupled to bus 1511 for communicating information and command selections to processor 1512. An additional user input device is cursor control 1523, such as a mouse, trackball, trackpad, stylus, or cursor direction keys, coupled to bus 1511 for communicating direction information and command selections to processor 1512, and for controlling cursor movement on display 1521.

Another device that may be coupled to bus 1511 is hard copy device 1524, which may be used for printing instructions, data, or other information on a medium such as paper, film, or similar types of media. Furthermore, a sound recording and playback device, such as a speaker and/or microphone may optionally be coupled to bus 1511 for audio interfacing with computer system 1500. Another device that may be coupled to bus 1511 is a wired/wireless communication capability 1525 to communication to a phone or handheld palm device.

Note that any or all of the components of system 1500 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims that in themselves recite only those features regarded as essential to the invention.

We claim:

1. A method comprising:
    inserting checkpoint code into each of one or more components that perform a legacy workflow including a series of processing operations related to a legacy workflow document, wherein, for each processing operation of the series of processing operations, the checkpoint code configured to:
        analyze data content that is processed by the components at the processing operation;
        calculate an identifier of the legacy workflow document based on the analyzed content; and
        add at least one metadata entry corresponding to a result of performing the processing operation to one or more other metadata entries in a document log associated with the legacy workflow document, wherein the document log is stored separately from the one or more components and the legacy workflow document;
    analyzing the metadata entries of the document log in order to identify one or more patterns found in words in the metadata entries of the document log;
    detecting the legacy workflow based on the identified patterns found in the words of the document log; and
    performing one or more operations related to the document in response to detecting the workflow.

2. The method defined in claim 1 wherein the checkpoint code configured to calculate the identifier includes calculating the identifier based on data being input into said each processing operation.

3. The method defined in claim 1 wherein the checkpoint code configured to calculate the identifier includes calculating the identifier based on data being output from said each processing operation.

4. The method defined in claim 1 further comprising:
    aggregating entries from two separate processing units and assigning sequence numbers to those entries.

5. The method defined in claim 4 wherein the entries are aggregated using the identifiers.

6. The method defined in claim 1 further comprising calculating two identifiers and making entries in a log associated with each identifier that references the other identifier.

7. The method defined in claim 1 wherein the at least one metadata entry comprises a document log entry.

8. The method defined in claim 1 wherein each identifier is based on content of said each metadata entry.

9. The method defined in claim 8 wherein the identifier is a hash value.

10. The method defined in claim 8 wherein the identifier is a result of applying a hashing function to an electronic form of the content.

11. The method defined in claim 10 wherein the hashing function is the MD5 hashing algorithm.

12. The method defined in claim 1 wherein the document log is in XML format.

13. The method defined in claim 12 wherein each entry in the document log is an XML segment.

14. The method defined in claim 1 wherein the document log is identified using the document identifier.

15. The method defined in claim 1 wherein the legacy workflow document comprises a plurality of bytes.

16. The method defined in claim 1 wherein the one or more patterns comprise an order of the words in the document log, wherein the order of the words is indicative of the workflow.

17. The method defined in claim 1 wherein the identified patterns include an occurrence of one of the words in the document log.

18. The method defined in claim 1 further comprising analyzing data in a plurality of document logs for a different legacy workflow documents and detecting the workflow based on patterns that repeat across the plurality of document logs.

19. The method defined in claim 1 further comprising accessing each of the metadata entries with an identifier based on content of said each metadata entry.

20. The method defined in claim 19 wherein the identifier is a hash value.

21. The method defined in claim 19 wherein the identifier is a result of applying a hashing function to an electronic form of the content.

22. The method defined in claim 1 further comprising:
accessing an electronic form of the document;
computing an identifier based on content of the electronic form of the document; and
retrieving the document log associated with the document.

23. The method defined in claim 22 wherein computing the document identifier comprises applying a hashing function to the content of the electronic form of the document.

24. The method defined in claim 1, wherein the one or more operations including at least one of adding additional metadata entries to the document log, performing a backup of the document log, storing information in a memory location associated with the document, sending an email related to the document, performing a remote procedure call related to the document, sending a text message related to the document, initiating a phone call related to the document, triggering a mechanical device related to the document, printing a document related to the document, and sending a fax related to the document.

25. An article of manufacture having one or more recordable media having instructions thereon which, when executed by a system, cause the system to perform a method comprising:
inserting checkpoint code into each of one or more components that perform a legacy workflow including a series of processing operations related to a legacy workflow document, wherein, for each processing operation of the series of processing operations, the checkpoint code configured to:
analyze data content that is processed by the components at the processing operation;
calculate an identifier of the legacy workflow document based on the analyzed content; and
add at least one metadata entry corresponding to a result of performing the processing operation to one or more other metadata entries in a document log associated with the legacy workflow document, wherein the document log is stored separately from the one or more components and the legacy workflow document;
analyzing the metadata entries of the document log in order to identify one or more patterns found in words in the metadata entries of the document log;
detecting the legacy workflow based on the identified patterns found in the words of the document log; and
performing one or more operations related to the document in response to detecting the workflow.

\* \* \* \* \*